United States Patent
Lee et al.

(10) Patent No.: US 8,821,617 B2
(45) Date of Patent: *Sep. 2, 2014

(54) POLYIMIDE-CO-POLYBENZOXAZOLE COPOLYMER, PREPARATION METHOD THEREOF, AND GAS SEPARATION MEMBRANE COMPRISING THE SAME

(75) Inventors: Young Moo Lee, Seoul (KR); Jae-Eun Lee, Seoul (KR); Chul-Ho Jung, Gwangju (KR); Ho-Bum Park, Seoul (KR)

(73) Assignee: Industry-University Cooperation Foundation, Hanyang University, Seoul (KR)

( * ) Notice: Subject to any disclaimer, the term of this patent is extended or adjusted under 35 U.S.C. 154(b) by 156 days.

This patent is subject to a terminal disclaimer.

(21) Appl. No.: 12/920,268

(22) PCT Filed: Mar. 6, 2008

(86) PCT No.: PCT/KR2008/001282
§ 371 (c)(1),
(2), (4) Date: Nov. 30, 2010

(87) PCT Pub. No.: WO2009/107889
PCT Pub. Date: Sep. 3, 2009

(65) Prior Publication Data
US 2011/0065823 A1 Mar. 17, 2011

(30) Foreign Application Priority Data
Feb. 28, 2008 (KR) .................. 10-2008-0018327

(51) Int. Cl.
*C08G 73/10* (2006.01)
*C08J 9/00* (2006.01)
*C08G 73/18* (2006.01)
*B01D 53/22* (2006.01)

(52) U.S. Cl.
CPC ............ *C08G 73/18* (2013.01); *B01D 2256/24* (2013.01); *Y02C 10/10* (2013.01); *B01D 2256/12* (2013.01); *B01D 2256/10* (2013.01); *B01D 2257/102* (2013.01); *C08G 73/10* (2013.01); *B01D 2257/7022* (2013.01); *B01D 2257/504* (2013.01); *B01D 2256/22* (2013.01); *B01D 53/228* (2013.01); *B01D 2257/104* (2013.01)
USPC ................................ 96/14; 528/353; 528/210

(58) Field of Classification Search
USPC .................................................. 528/210, 353
See application file for complete search history.

(56) References Cited

U.S. PATENT DOCUMENTS

| 3,899,307 A | 8/1975 | Thompson |
| 3,899,309 A | 8/1975 | Hoehn et al. |

(Continued)

FOREIGN PATENT DOCUMENTS

| CN | 1139021 | 1/1997 |
| JP | 01-159024 | 6/1989 |

(Continued)

OTHER PUBLICATIONS

Kim et al (Synthesis and Characterization of Soluble Polyimides Containing Trifluoromethyl Groups in their Backbone, Journal of Polymer Science Part B: Polymer Physics, vol. 42, 4303-4312, 2004).*

(Continued)

*Primary Examiner* — Randy Gulakowski
*Assistant Examiner* — Rachel Kahn
(74) *Attorney, Agent, or Firm* — Lexyoume IP Meister, PLLC

(57) ABSTRACT

Disclosed herein are a polyimide-polybenzoxazole copolymer, a method for preparing thereof and a gas separation membrane comprising the same. More specifically, provided are a polyimide-polybenzoxazole copolymer simply prepared through thermal-rearrangement performed by thermally treating a polyimide-poly(hydroxyimide) copolymer as a precursor, a method for preparing the same, and a gas separation membrane comprising the same. The copolymer shows superior gas permeability and gas selectivity, thus being suitable for use in gas separation membranes in various forms such as films, fibers or hollow fibers. The gas separation membrane thus prepared can advantageously endure even harsh conditions such as long operation time acidic conditions and high humidity due to the rigid polymer backbone present in the copolymer.

38 Claims, 14 Drawing Sheets

(56) References Cited

U.S. PATENT DOCUMENTS

| | | | |
|---|---|---|---|
| 4,820,793 | A | 4/1989 | Imai et al. |
| 4,931,182 | A | 6/1990 | Burgoyne, Jr. et al. |
| 4,978,733 | A | 12/1990 | Khanna |
| 4,980,447 | A | 12/1990 | Khanna |
| 4,981,940 | A | 1/1991 | Konotsune et al. |
| 5,034,026 | A | 7/1991 | Summers |
| 5,071,948 | A | 12/1991 | Khanna |
| 5,076,816 | A | 12/1991 | Avrillon et al. |
| 5,173,561 | A | 12/1992 | Gupta |
| 5,202,412 | A * | 4/1993 | Auman et al. ............... 528/353 |
| 5,262,056 | A | 11/1993 | Koros et al. |
| 5,525,436 | A | 6/1996 | Savinell et al. |
| 5,558,936 | A | 9/1996 | Chung et al. |
| 5,591,250 | A | 1/1997 | Stern et al. |
| 5,716,727 | A | 2/1998 | Savinell et al. |
| 5,723,086 | A | 3/1998 | Ledjeff et al. |
| 5,725,769 | A | 3/1998 | Miller et al. |
| 5,753,008 | A | 5/1998 | Friesen et al. |
| 5,837,032 | A | 11/1998 | Moll et al. |
| 5,868,975 | A | 2/1999 | Lee et al. |
| 5,919,892 | A | 7/1999 | Hwang et al. |
| 5,985,969 | A | 11/1999 | Harris et al. |
| 6,099,988 | A | 8/2000 | Savinell et al. |
| 6,204,356 | B1 | 3/2001 | Saito et al. |
| 6,383,258 | B1 | 5/2002 | Simmons |
| 6,548,621 | B1 | 4/2003 | Tsai et al. |
| 6,890,626 | B1 * | 5/2005 | Itatani et al. ............... 428/195.1 |
| 7,745,516 | B2 | 6/2010 | Dueber et al. |
| 8,163,071 | B2 | 4/2012 | Lee |
| 2003/0164090 | A1 | 9/2003 | Ding et al. |
| 2004/0229160 | A1 | 11/2004 | Naiini et al. |
| 2004/0229166 | A1 | 11/2004 | Rushkin et al. |
| 2004/0229167 | A1 | 11/2004 | Naiini et al. |
| 2004/0249110 | A1 | 12/2004 | Naiini et al. |
| 2004/0253537 | A1 | 12/2004 | Rushkin et al. |
| 2004/0253542 | A1 | 12/2004 | Rushkin et al. |
| 2005/0181297 | A1 | 8/2005 | Naiini et al. |
| 2005/0242021 | A1 | 11/2005 | Ditter et al. |
| 2006/0004180 | A1 | 1/2006 | Itatani |
| 2006/0011063 | A1 | 1/2006 | Zhou |
| 2006/0216641 | A1 | 9/2006 | Naiini et al. |
| 2006/0275699 | A1 | 12/2006 | Naiini et al. |
| 2007/0099111 | A1 | 5/2007 | Naiini et al. |
| 2009/0111050 | A1 | 4/2009 | Naiini et al. |
| 2009/0197067 | A1 | 8/2009 | Naiini et al. |
| 2009/0282982 | A1 | 11/2009 | Jung et al. |
| 2009/0286078 | A1 | 11/2009 | Lee et al. |
| 2009/0286904 | A1 | 11/2009 | Lee et al. |
| 2009/0297850 | A1 | 12/2009 | Jung et al. |
| 2010/0099804 | A1 | 4/2010 | Lee et al. |

FOREIGN PATENT DOCUMENTS

| | | |
|---|---|---|
| JP | 05-506054 | 9/1993 |
| JP | 08-229366 | 9/1996 |
| JP | 08-243367 | 9/1996 |
| JP | 08-290046 | 11/1996 |
| JP | 08-299769 | 11/1996 |
| JP | 2001-348428 | 12/2001 |
| JP | 2003-024755 | 1/2003 |
| JP | 2007-136453 | 6/2007 |
| JP | 2007-167852 | 7/2007 |
| KR | 10-2006-0085845 | 7/2006 |
| WO | 91/16123 | 10/1991 |
| WO | 93-02858 | 2/1993 |
| WO | 2006/080766 | 8/2006 |
| WO | 2007/007051 | 1/2007 |
| WO | 2008/131907 | 11/2008 |
| WO | 2009/107889 | 9/2009 |
| WO | 2009/113747 | 9/2009 |
| WO | 2009/142434 | 11/2009 |

OTHER PUBLICATIONS

Blackburn, Victoria, What is a polymer chain?, WiseGeek Artical, 2003-2012 Conjecture Corporation. http://www.wisegeek.com/what-is-a-polymer-chain.htm.

Chemicalland21, Benzoxazole Data Sheet; http://www.chemicalland21.com/industrialchem/organic/benzoxazole.htm.

Bruma et al., "Fluorinated Poly)benzoxzaole-Imide)s" Polymers for Advanced Technology, vol. 5, 535-540 (1993).

Chen et al., "2,6-Diamino-4-phenylphenol (DAPP) copolymerized polyimides: synthesis and characterization" Polym. Int., 55:93-100 (2006).

D. A. Doyle et al, The Structure of the Potassium Channel: Molecular Basis of K+ Conduction and Selectivity, Science 1998, 280, 69-77.

B.D. Freeman, Basis of Permeability/ Selectivity Tradeoff Relations in Polymeric Gas Separation Membranes, Macromolecules, 1999, 32, 375-380.

Ronghuan He, et al., Proton conductivity of phosphoric acid doped polybenzimidazole and its composites with inorganic proton conductors, Journal of Membrane Science, 2003, 226, 169-184.

M.A. Hickner et al., Alternative Polymer Systems for Proton Exchange Membrane (PEMs), Chem. Rev. 2004, 104, 4587-4612.

B. Jeong et al., Biodegradable block copolymers as injectable drug-delivery systems, Nature, 1997, 388, 860-862.

Jung, C.H. et al., Gas Permeation Properties of Hydroxy-Group Containing Polyimide Membranes, Macromolecular Research, Aug. 31, 2008, vol. 16, pp. 555-560.

Khanna & Mueller, "New High Temperature Stable Positive Photoresists Based on Hydroxy Polyimides and Polyamides Containing the Hexafluroroisopropylidene (6-F) Linking Group" Polymer Engineering & Science, Jul. 1989, vol. 29, No. 14, 954-959.

D. Kozono et al., Aquaporin water channels: atomic structure and molecular dynamics meet clinical medicine, Invest. 2002, 109, 1395-1399.

Z. Lai et al., Microstructural Optimization of a Zeolite Membrane for Organic Vapor Separation, Science 2003, 300, 456-460.

P. Lightfoot et al., Crystal Structure of the Polymer Electrolyte Poly-(ethylene oxide)3:LiCF3SO3, Science, 1993, 262, 883-885.

H. Lin et al., Plasitcization-Ebhanced Hydrogen Purification Using Polymeric Membrane, Science 2006, 311, 639-642.

Mercer, Frank W., et al., Synthesis and Characterization of New Fluorinated Poly(imide benzoxazole)s, High Performance Polymers, 1996, vol. 8, pp. 395-406.

K. Nagai et al, Poly[1-(trimethylsilyl)-1-propyne] and related polymers: synthesis, properties and functions, Polym. Sci. 2001, 26, 721-798.

Ken-Inchi Okamoto, et al., Gas Permeability and Permselectivity of Fluorinated Polybenzoxazoles, J. Polym. Sci. Part B., Polym Phys. 30, 1215-1221.

H.B. Park, et al., Fabrication and Characterization of Nanoporous Carbon/Silica Membranes, Adv. Mater. 2005, 17, 477-483.

Preston et al, "New High-Temperature Polymers. VIII. Ordered Benzoxazole- and Benzothiazole-Imide Copolymers" Journal of Polymer Science, A-1, vol. 7, 283-296 (1969).

L.M. Robeson, The Upper Bound Revisited J. Membr Sci. 2008, 320, 390-400.

L.M. Robeson, Correlation of Separation Factor Versus Permeability for Polymeric Membrane, J. Membr. Sci., 1991, 62, 165-185.

Sundar and Mathias, "Novel Thermooxidatively Stable Poly (ether-imide-benzoxazole) and Poly (ester-imide-benzoxazole)" Journal of Polymer Science: Part A: Polymer Chemistry, vol. 32, 2825-2839 (1994).

Tseitlin et al. "Destruction of Polymers with Benzoxazole and Imide Fragments in the Main Chain" J. Polym. Sci.: Symposium. No. 42, 1305-1312 (1973).

Ueda et al, "Synthesis of Poly(benzoxazole)s by Direct Polycondensation of Dicarboxylic Acids with 3,3'-Dihydroxybenzidine Dihydrochloride Using Phosphorous Pentoxide/Methanesulfonic Acid as Condensing Agent and Solvent" Journal of Polymer Science: Part A, Polymer Chemistry vol. 24, 1019-1026 (1986).

(56) References Cited

OTHER PUBLICATIONS

V.J. Vasudevan, J.E. McGrath, Atomistic Modeling of Amorphous Aromatic Polybenzoxazoles, Macromolecules 1996, 29, 637-645.
W. J. Welsh, D. Bhaumik, J.E. Mark, Pheylene Group Rotations and Nonplanar Conformations in Some cis-and trans-Poly(benzobisoxazoles) and -Poly(benzobisthiazoles), Macromolecules 1981, 14, 947-950.
B.R. Wilks et al., Impact of Average Free-Volume Element Size on Transport in Stereoisomers of Polynorbornene. I. Properties at 35C, J. Polym. Sci. Part B: Polym. Phys. 2003, 41, 2185.
Wu et al, "Synthesis and Properties of Aromatic Polyimide, Poly(benzoxazole imide), and Poly(benzoxazole amide imide)" Journal of Applied Polymer Science, vol. 113, 2301-2312 (2009).
H.B. Park, C.H. Jung, Y. M. Lee et al, Polymers with Cavities Tuned for Fast Selective Transport of Small Molecules and Ions Science, Oct. 12, 2007, 318, pp. 254-258.
McKensie et al, "Synthesis and Characterization of New Fluorinated Poly(Imide Benzoxazole)s" High Performance Polymers, Sep. 1996, vol. 8, No. 3, 395-406.
Tullos, Gordon L. et al, Thermal Conversion of Hydroxy-Containing Imides to Benzoxazoles: Polymer and Model Compound Study, Macromolecules, Published on Web Jun. 5, 1999, vol. 32, pp. 3598-3612.
Ho Bum Park, et al., Polymers with cavities tuned for fast selective transport of small molecules and ions, Science, Oct. 12, 2007, vol. 318, pp. 254-258.
Niwa M et al., Surface orientation effect of asymmetric polyimide hollow fibers on their gas trasnsport properties, Journal of Membrane Science 230 (2004), pp. 141-148.
M. Niwa, Journal of Membrane Science, 2004, vol. 230, pp. 141-148.
Ho Bum Park et al, "Polymers with Cavities Tunes for Fast Selective Transport of Small Molecules and Ions", Science 318, Oct. 12, 2007, 254.
Chang Hyun Lee et al., "Highly proton conductive and highly reliable polybenzoxazole with peculiar microporous structure for high-temperature and water-free PEMFC systems", Desalination, Nov. 20, 2006, vol. 200, No. 1-3, pp. 664-665.
USPTO, Office Action of U.S. Appl. No. 12/468,859 (Sep. 27, 2013).
WiseGeek Article "What Is a Polymer Chain?" written by Victoria Blackburn and Industrial Chem Data Sheet (Nov. 10, 2013 ).
USPTO, Non-Final Rejection against U.S. Appl. No. 12/468,859 (Dec. 31, 2013).
Tullos et al., Thermal Conversion of Hydroxy-Containing Imides to Benzoxazoles: Polymer and Model Compound Study, Macromolecules, 32, pp. 3598-3612 (May 6, 1999).

\* cited by examiner

POLYIMIDE-CO-POLYBENZOXAZOLE COPOLYMER, PREPARATION METHOD THEREOF, AND GAS SEPARATION MEMBRANE COMPRISING THE SAME

TECHNICAL FIELD

The present invention relates to a polyimide-polybenzoxazole copolymer, a method for preparing thereof and a gas separation membrane comprising the same. More specifically, the present invention relates to a polyimide-polybenzoxazole copolymer suitable for use in the preparation of gas separation membranes applicable to various types of gases in a variety of forms such as films, fibers and hollow fibers due to its superior gas permeability and gas selectivity, a method for preparing the copolymer and a gas separation membrane comprising the copolymer.

BACKGROUND ART

Polyimides are high-performance macromolecules which are generally obtained via polycondensation of aromatic and/or alicyclic dianhydride and diamine structures [E. Pinel, D. Brown, C. Bas, R. Mercier, N. D. Alberola, S. Neyertz. Chemical Influence of the dianhydride and the diamine structure on a series of copolyimides studied by molecular dynamics simulations. *Macromolecules.* 2002; 35:10198-209].

These aromatic polyimides have been used in many high technology fields due to their excellent thermal, mechanical and electrical properties [Y. Li, X. Wang, M. Ding, J. Xu. Effects of molecular structure on the permeability and permselectivity of aromatic polyimides. *J Appl Polym Sci.* 1996; 61:741-8].

Among those applications, gas separation using polyimides has attracted great interest, because polyimides have significantly better permselective performance than typical glassy polymers such as cellulose acetate and polysulfone [A. Bos, I. G. M. Punt, M. Wessling, H. Strathmann. Plasticization-resistant glassy polyimide membranes for $CO_2/CH_4$ separations. *Sep Purif Technol.* 1998; 14:27-39].

In addition, high temperature polymers (e.g., polybenzimidazole, polybenzoxazole and polybenzothiazole) have drawn a great deal of attention due to their potential of obtaining superior gas separation performance under harsh conditions. In order to use the polymers for membrane materials, mild fabrication processes are required instead of using acidic solvents.

For example, fluorinated polybenzoxazole membranes can be synthesized by solution cyclization techniques using mild solvents [W. D. Joseph, J. C. Abed, R. Mercier, J. E. McGrath. Synthesis and characterization of fluorinated polybenzoxazoles via solution cyclization techniques. *Polymer.* 1994; 35:5046-50]. Their gas permeability increases according to the degree of cyclization of benzoxazole rings because increases in solubility and diffusivity coefficient are observed after cyclization [K. Okamoto, K. Tanaka, M. Muraoka, H. Kita, Y. Maruyama. Gas permeability and permselectivity of fluorinated polybenzoxazoles. *J Polym Sci Pol Phys.* 1992; 30:1215-21].

Meanwhile, Burns and Koros proposed a polymeric molecular sieve concept using ultrarigid polymers which exhibited entropic selectivity capabilities [R. L. Burns, W. J. Koros. Structure-property relationships for poly(pyrrolone-imide) gas separation membranes. *Macromolecules.* 2003; 36:2374-81]. Poly(pyrrolone-imides) composed of open regions and bottleneck selective regions can mimic molecular sieves by tuning the polymeric matrix through the use of different monomer stoichiometry.

In an attempt to find the ways to improve gas permeability, the inventors of the present invention have conducted research based upon the fact that copolymerization of high temperature polymers and polyimides results in higher gas separation performance. As a result, the present inventors have disclosed polymer structures acting as permeable sites and considered incorporating the polymer structures into polyimide backbones.

Consequently, the present inventors ascertained that aromatic polymers interconnected with heterocyclic rings (e.g., benzoxazole, benzothiazole and benzopyrrolone) showed higher gas permeation performance due to their well-controlled free volume element formation by thermal rearrangement in the glassy phase. In addition, these materials have a flat and rigid rod structure with high torsional energy barriers to rotation between respective rings. An increase in rigidity of polymer backbones with high microporosity showed positive effects in improving gas separation performance.

DISCLOSURE

Technical Problem

Therefore, it is one object of the present invention to provide a polyimide-polybenzoxazole copolymer that has microcavities, exhibits increased polymer backbone rigidity and improved fractional free volume, and shows superior gas permeability and gas selectivity, and a method for preparing the copolymer.

It is another object of the present invention to provide a gas separation membrane comprising the polyimide-polybenzoxazole copolymer, suitable for application to various types of gases, and a method for preparing the gas separation membrane.

It is yet another object of the present invention to provide a precursor used for the preparation of the polyimide-polybenzoxazole copolymer.

Technical Solution

In accordance with one aspect of the present invention for achieving the above object, there is provided a polyimide-polybenzoxazole copolymer having repeating units represented by Formula 1 below:

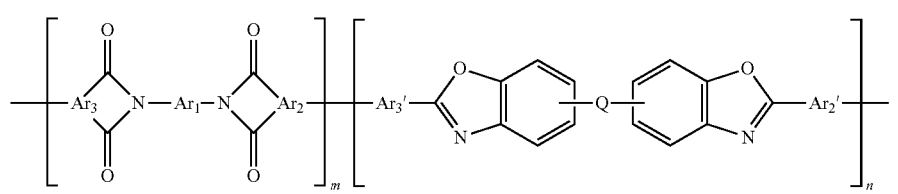

Formula 1 wherein $Ar_1$, $Ar_2'$ and $Ar_3'$ are identical or different, are each independently a bivalent $C_5$-$C_{24}$ arylene group or a bivalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring, or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), (CH$_3$)$_2$, C(CF$_3$)$_2$ and C(=O)NH;

$Ar_2$ and $Ar_3$ are identical or different, are each independently a trivalent $C_5$-$C_{24}$ arylene group or a trivalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$ and C(=O)NH;

Q is O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$, C(=O)NH, C(CH$_3$)(CF$_3$), $C_1$-$C_6$ alkyl-substituted phenyl or $C_1$-$C_6$ haloalkyl-substituted phenyl in which Q is linked to opposite both phenyl rings in the position of m-m, m-p, p-m or p-p;

m is an integer of 10 to 400; and n is an integer of 10 to 400.

In accordance with another aspect of the present invention, there is provided a method for preparing a polyimide-polybenzoxazole copolymer of Formula 1 by thermally treating a polyimide-poly(hydroxyimide) copolymer of Formula 2, as depicted in Reaction Scheme 1 below:

Reaction Scheme 1

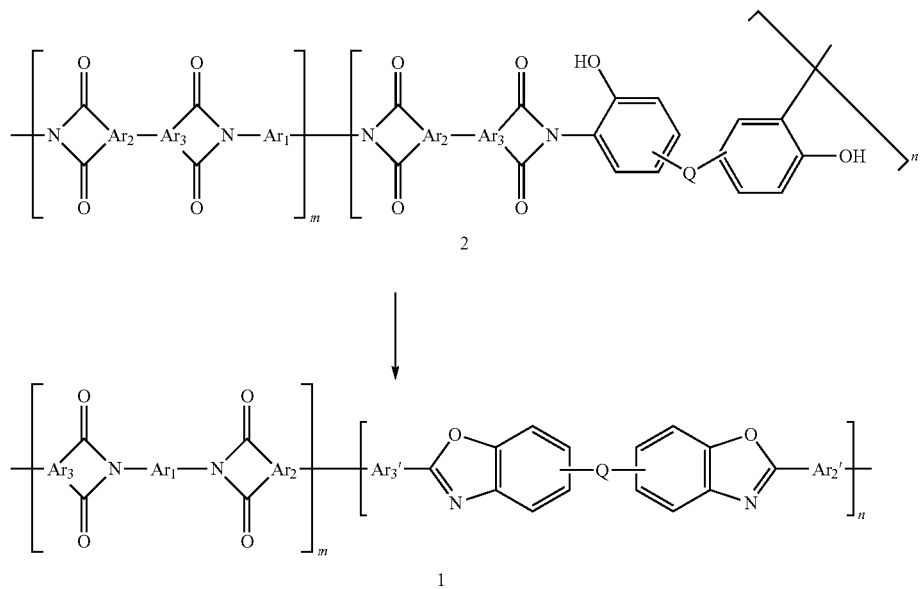

wherein $Ar_1$, $Ar_2$, $Ar_2'$, $Ar_3$, $Ar_3'$, Q, m and n are defined as above.

In accordance with another aspect of the present invention, there is provided a gas separation membrane comprising the polyimide-polybenzoxazole copolymer of Formula 1.

In accordance with another aspect of the present invention, there is provided a method for preparing a gas separation membrane comprising the polyimide-poly(hydroxyimide) copolymer of Formula 1, comprising casting the polyimide-polybenzoxazole copolymer of Formula 2, followed by thermal treatment.

In accordance with another aspect of the present invention, there is provided a polyimide-poly(hydroxyimide) copolymer as an intermediate used for the preparation of the polyimide-polybenzoxazole copolymer.

Advantageous Effects

The polyimide-polybenzoxazole copolymer according to the present invention is simply prepared through thermal-rearrangement performed by thermally treating the polyimide-poly(hydroxyimide) copolymer as a precursor. The polyimide-polybenzoxazole copolymer thus prepared exhibits increased polymer backbone rigidity and improved fractional free volume.

The present copolymer shows superior gas permeability and gas selectivity, thus being suitable for use in gas separation membranes in various forms such as films, fibers or hollow fibers. It is advantageous that the gas separation membrane thus prepared can endure harsh conditions such as long operation temperature, acidic conditions and high humidity due to the rigid polymer backbone present in the copolymer.

DESCRIPTION OF DRAWINGS

The above and other objects, features and other advantages of the present invention will be more clearly understood from the following detailed description taken in conjunction with the accompanying drawings, in which.

BEST MODE

Figure 1:
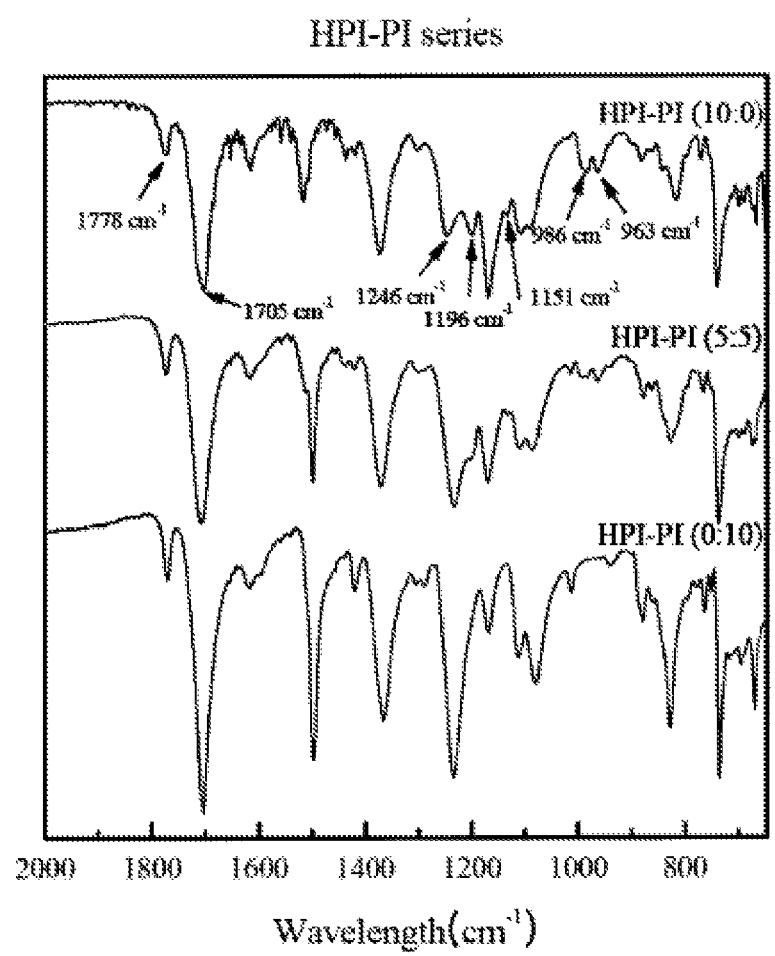
FIG. 1 is FT-IR spectra of HPI-PI precursor membranes prepared at various copolymerization ratios.

Hereinafter, the present invention will be illustrated in more detail.

In one aspect, the present invention is directed to a polyimide-polybenzoxazole copolymer (hereinafter, referred to as a 'PBO-PI copolymer') having repeating units represented by Formula 1 below:

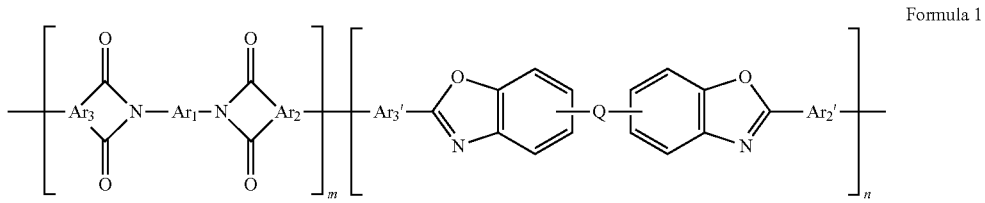

Formula 1 wherein $Ar_1$, $Ar_1'$ and $Ar_3'$ are identical or different, are each independently a bivalent $C_5$-$C_{24}$ arylene group or a bivalent $C_5$-$C_{24}$ heterocyclic ring which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring, or covalently bonded to each other via a functional group selected from the group consisting of O, S, C(=O), CH(OH), S(=O)$_2$, Si(CH$_3$)$_2$, (CH$_2$)$_p$ (in which 1≤p≤10), (CF$_2$)$_q$, (in which 1≤q≤10), C(CH$_3$)$_2$, C(CF$_3$)$_2$ and C(=O)NH;

$Ar_2$ and $Ar_3$ are identical or different, are each independently a trivalent $C_5$-$C_{24}$ arylene group or a trivalent $C_5$-$C_{24}$ heterocyclic ring which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring, or covalently bonded to each other via a functional group selected from the group consisting of O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$ and C(=O)NH;

Q is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, C(=O)NH, C(CH$_3$)(CF$_3$), or $C_1$-$C_6$ alkyl-substituted phenyl or $C_1$-$C_6$ haloalkyl-substituted phenyl in which Q is linked to opposite both phenyl rings in the position of m-m, m-p, p-m or p-p;

m is an integer of 10 to 400; and n is an integer of 10 to 400.

In Formula 1, $Ar_1$, $Ar_2$, $Ar_2'$, $Ar_3$, and $Ar_3'$ may be the same arylene group or heterocyclic ring.

Preferably, $Ar_1$, $Ar_2'$ and $Ar_3'$ are selected from the following compounds and the linkage position thereof includes all of o-, m- and p-positions.

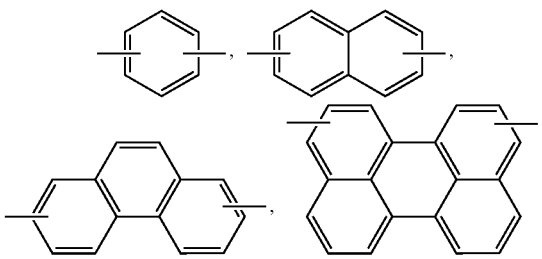

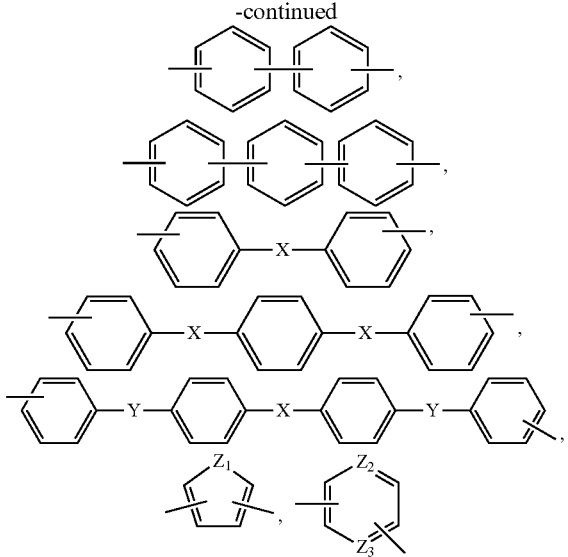
wherein X is O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$, or C(=O)NH; Y is O, S or C(=O); and Z$_1$, Z$_2$ and Z$_3$ are identical or different and are O, N or S.
More preferably, Ar$_1$, Ar$_2$' and Ar$_3$' are selected from the following compounds:
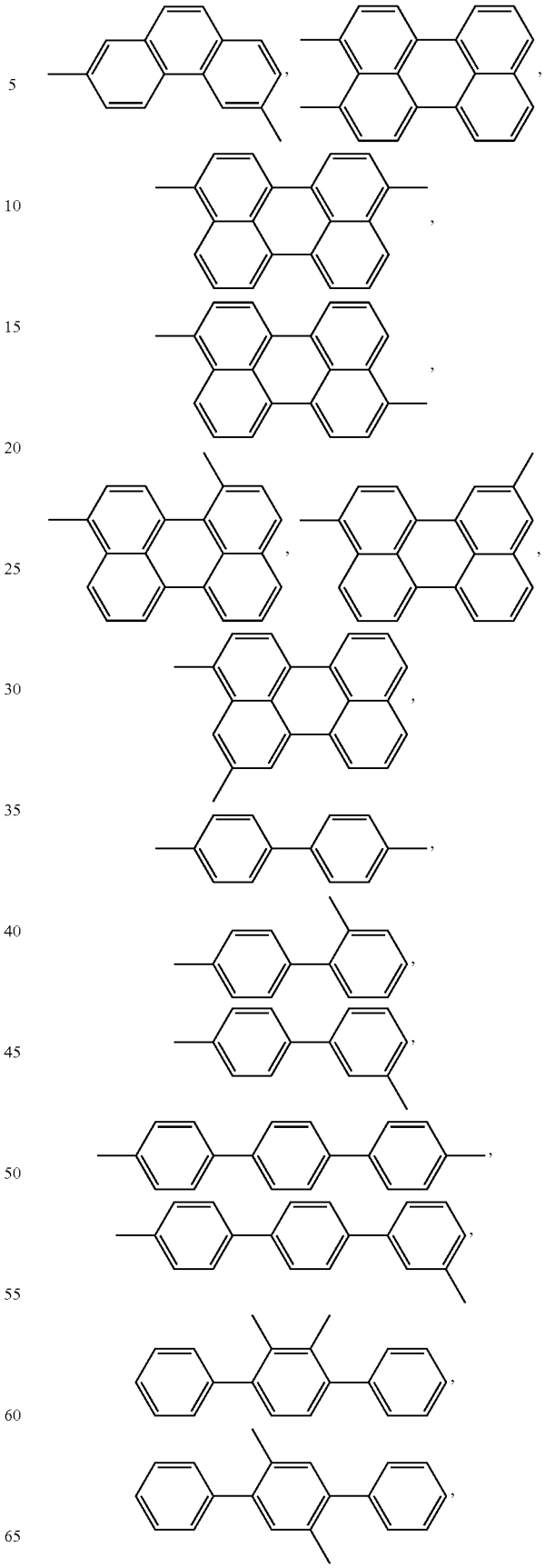

-continued
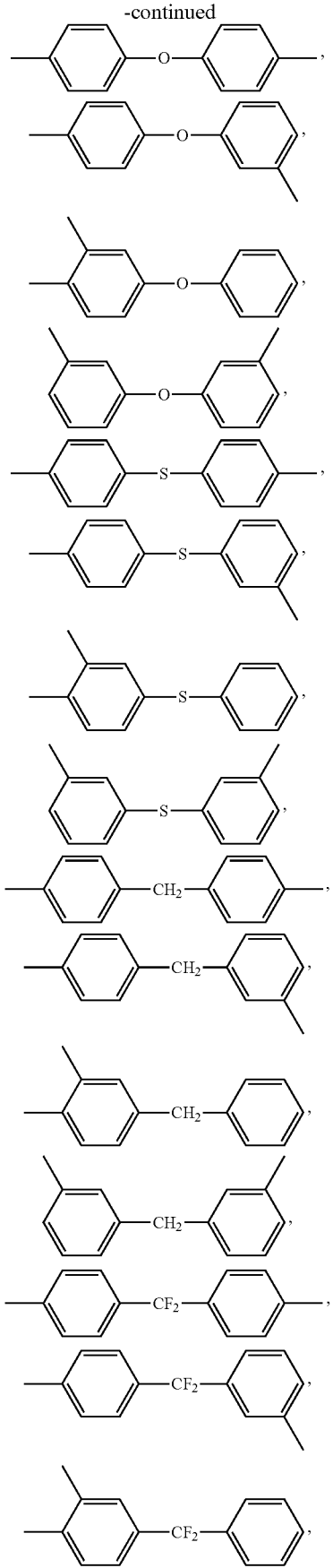
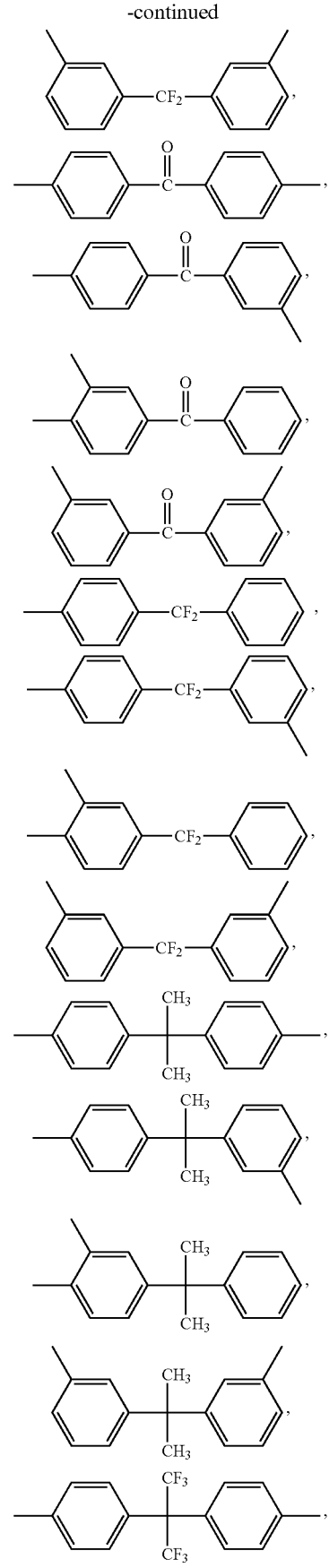

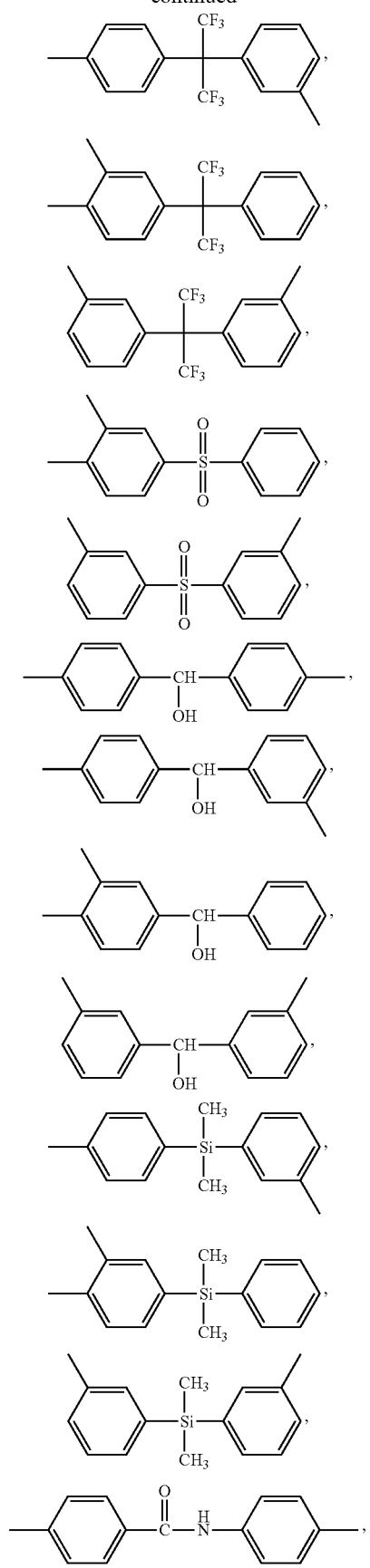
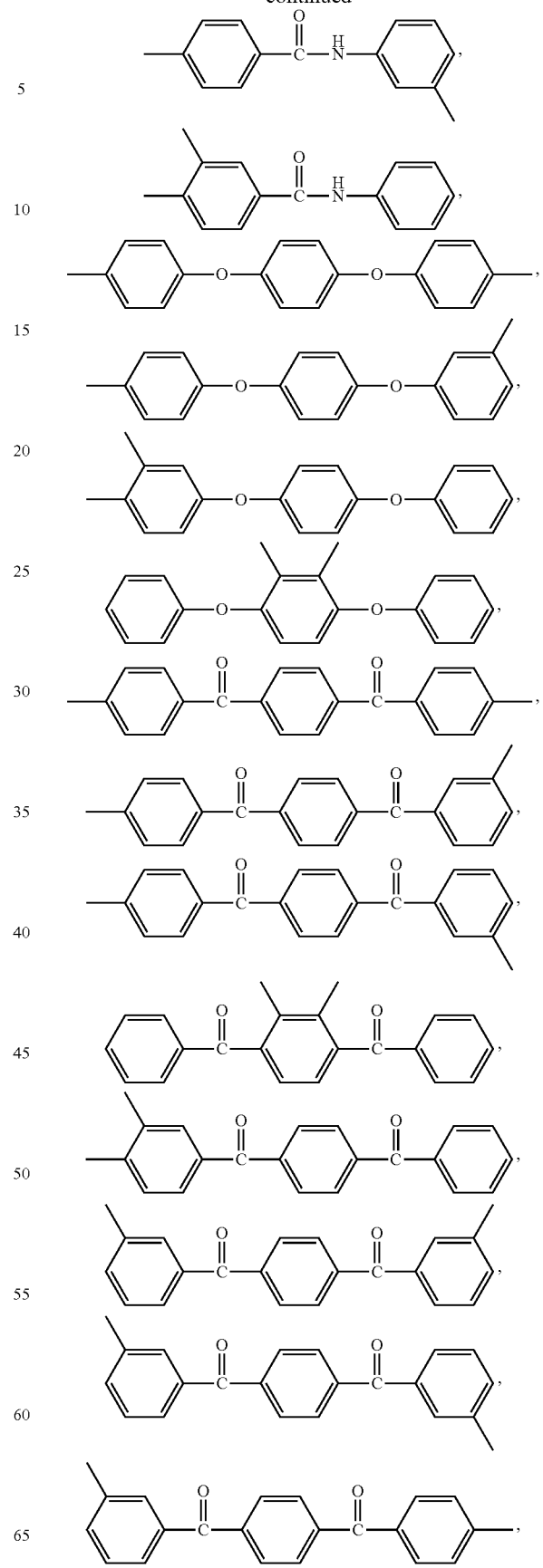

-continued

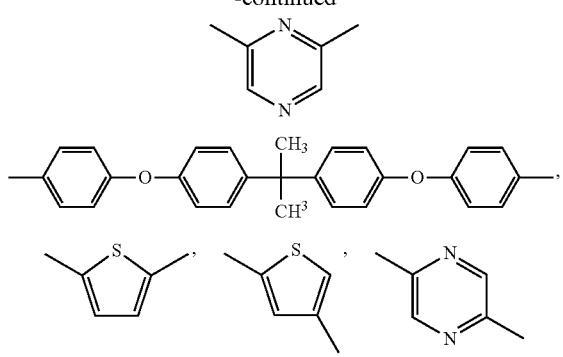

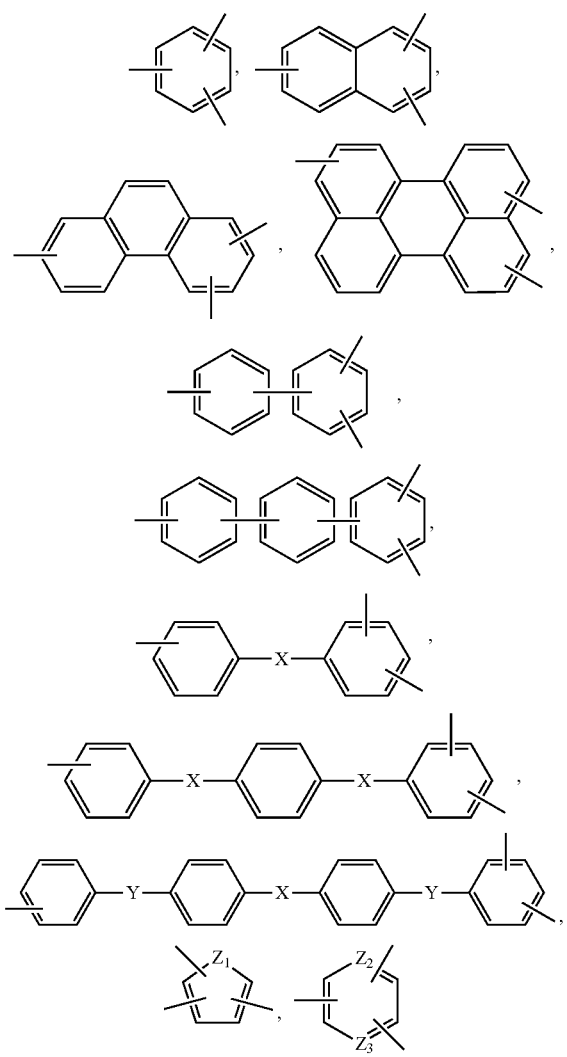

Preferably, Ar$_2$ and Ar$_3$ are selected from the following compounds and the linkage position thereof includes all of o-, m- and p-positions.

wherein X is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, or C(=O)NH; Y is O, S or C(=O); and Z$_1$, Z$_2$ and Z$_3$ are identical or different and are O, N or S.

More preferably, Ar$_2$ and Ar$_3$ are selected from the following compounds.

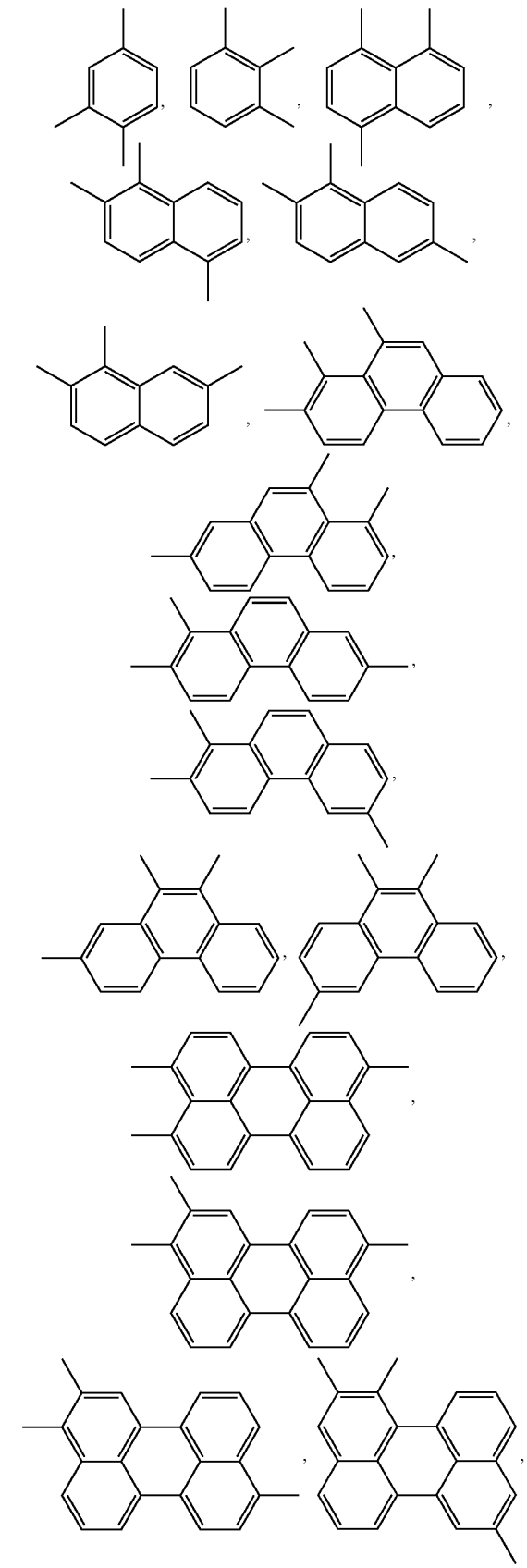

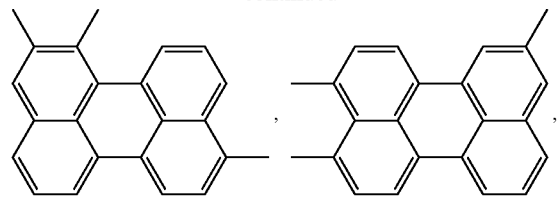
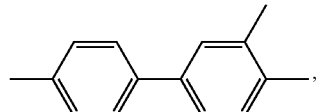
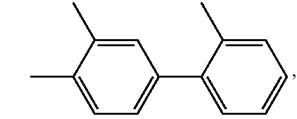
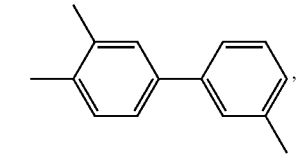
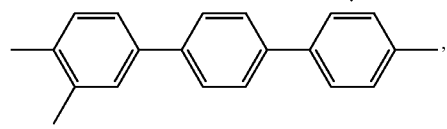
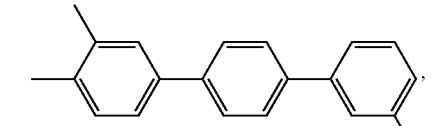
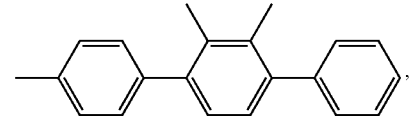
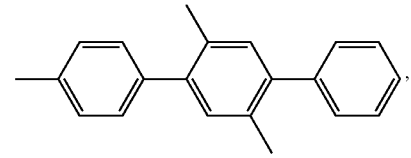
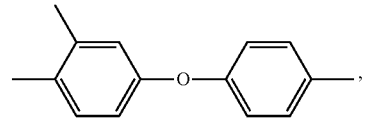
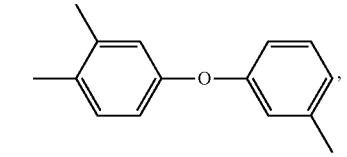
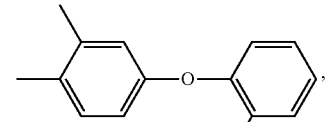
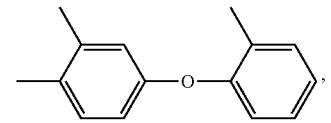
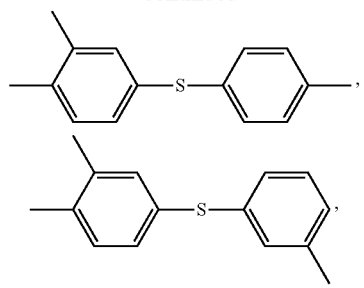
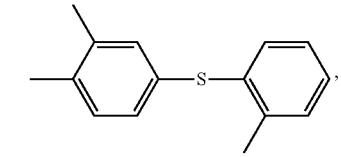
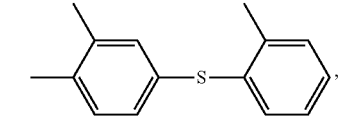
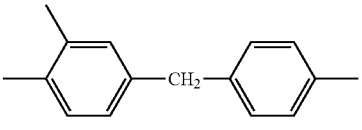
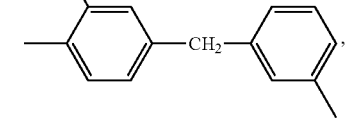
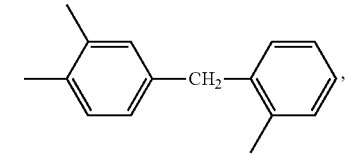
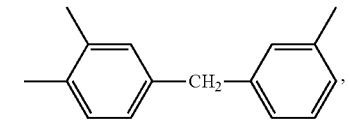
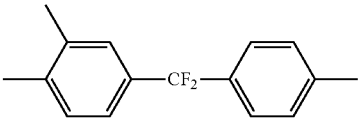
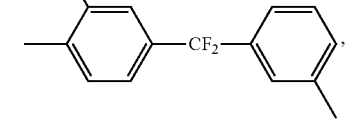
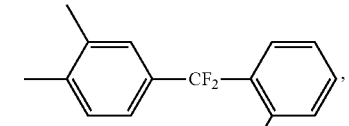
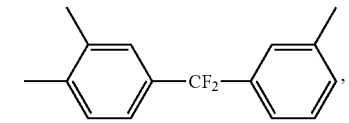

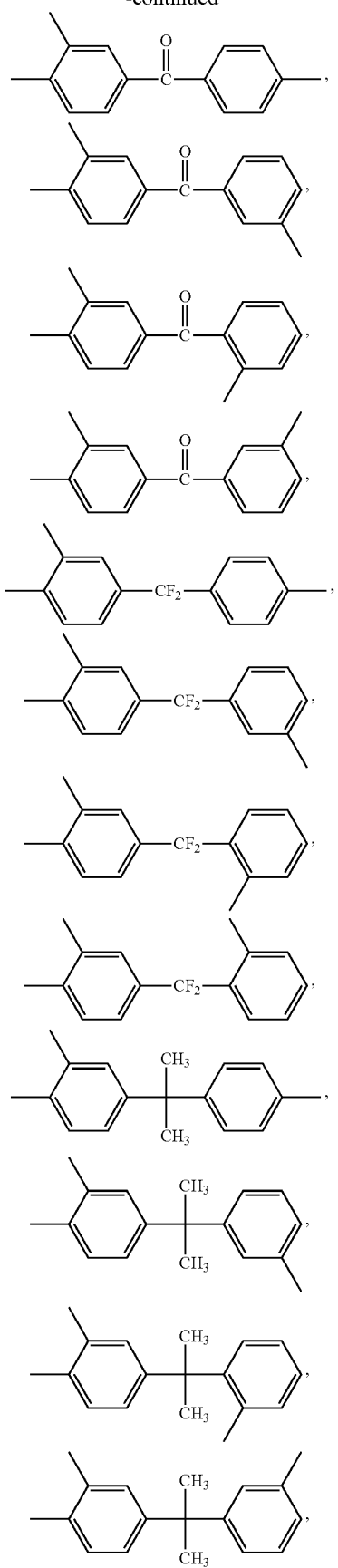
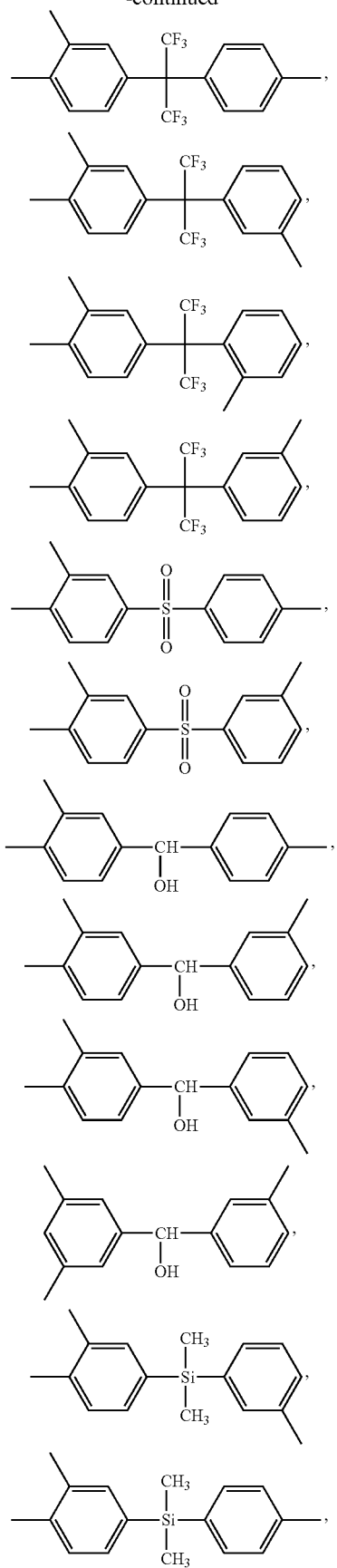

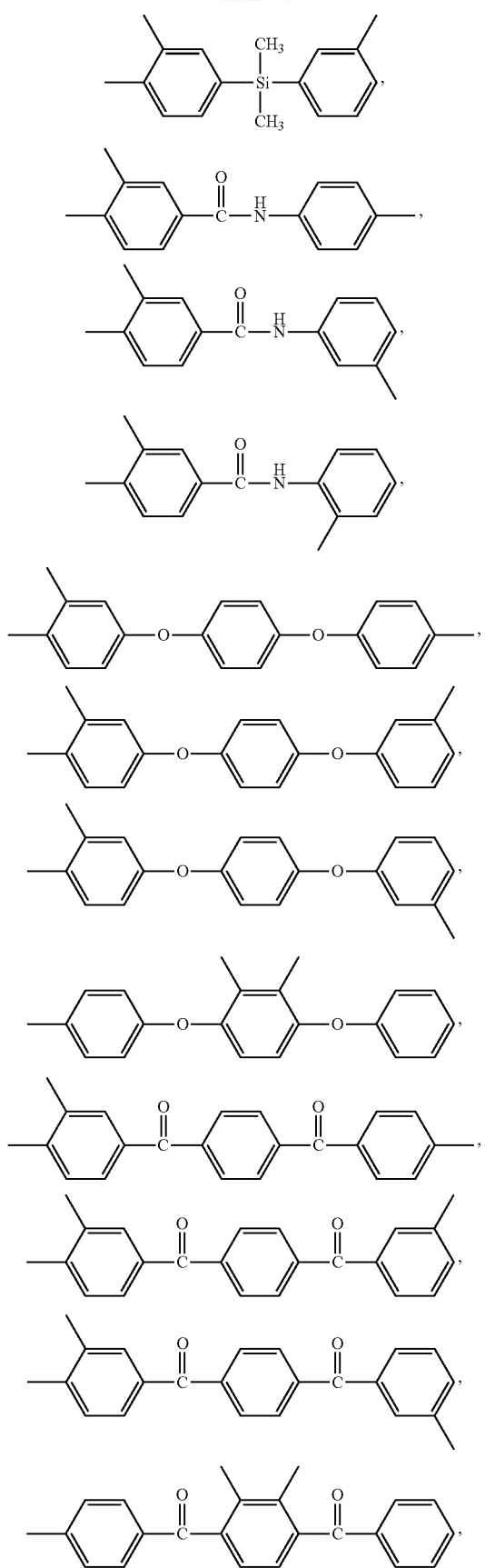
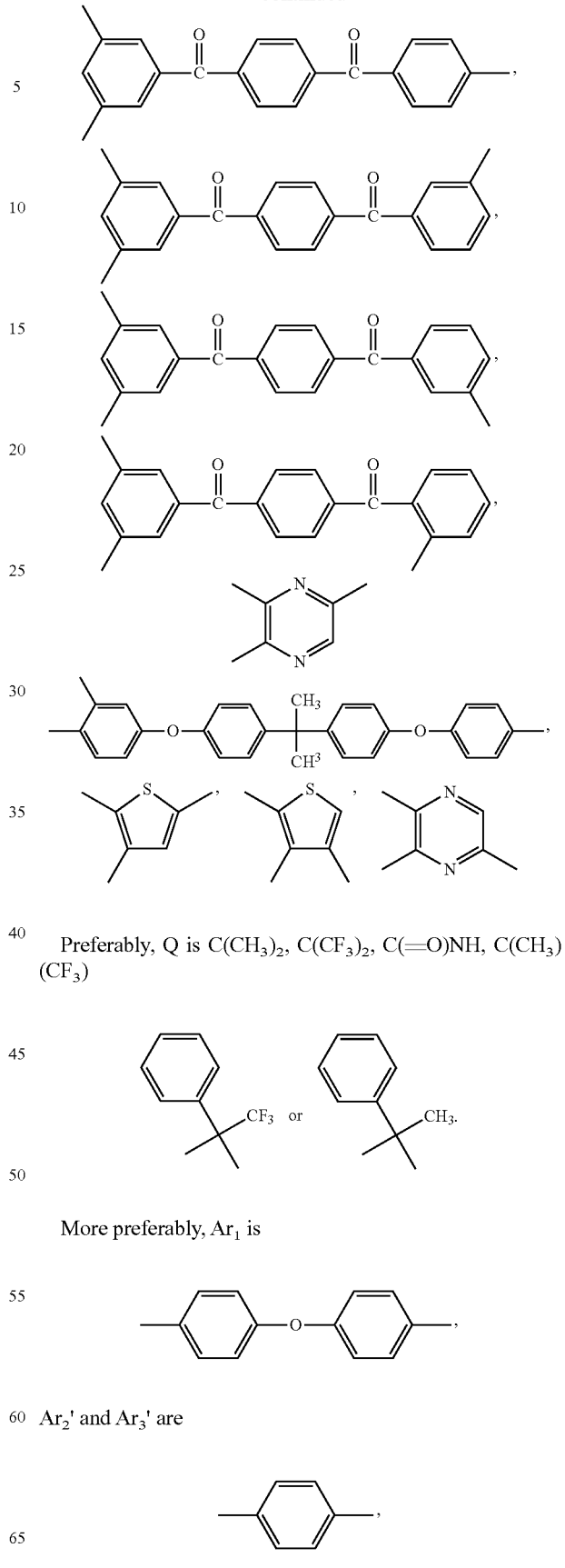
Preferably, Q is $C(CH_3)_2$, $C(CF_3)_2$, $C(=O)NH$, $C(CH_3)(CF_3)$
More preferably, $Ar_1$ is
$Ar_2{}'$ and $Ar_3{}'$ are $Ar_2$ and $Ar_3$ are

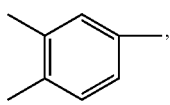

and Q is $C(CF_3)_2$.

The physical properties of the PBO-PI copolymer represented by Formula 1 can be controlled by controlling a copolymerization ratio of PBO to PI blocks. The copolymerization ratio of PBO to PI (n:m) is adjusted to 1:9 to 9:1, more preferably, 2:8 to 8:2, most preferably, 3:7 to 7:3. This copolymerization ratio affects the morphology of the membrane for gas separation applications, as illustrated in the following. This morphological change is closely related to gas permeability and gas selectivity. For this reason, control over the copolymerization ratio is considerably important.

Preferably, the PBO-PI copolymer has a density of 1.10 to 1.37 $g/cm^3$, a fractional free volume (FFV) of 0.10 to 0.30, and a d-spacing of 0.55 to 0.70 nm.

In another aspect, the present invention is directed to a method for preparing a polyimide-polybenzoxazole copolymer of Formula 1 by thermally treating a polyimide-poly(hydroxyimide) copolymer of Formula 2, as depicted in Reaction Scheme 1 below:

size and increased d-spacing, as compared to the precursor 2. As a result, the PBO-PI copolymer 1 exhibits considerably high gas permeability, as compared to the precursor 2.

Such a morphological property can be readily controlled by the design taking into consideration the characteristics (e.g., steric hindrance) of the functional groups, $Ar_1$, $Ar_2$, $Ar_2'$, $Ar_3$, $Ar_3'$ and Q, present in the molecular structure and permeability and selectivity to various types of gases can thus be controlled.

According to the present invention, the thermal treatment is carried out at 150 to 500° C., preferably 350 to 450° C. for 5 minutes to 12 hours, preferably for 10 minutes to 2 hours under an inert atmosphere. When the thermal treatment temperature is less than the level as defined the above, the thermal rearrangement is incomplete, thus remaining unreacted precursors, causing deterioration of purity. Increasing the thermal treatment temperature above the level defined above provides no particular advantage, thus being economically impractical. Accordingly, the thermal treatment is properly carried out within the temperature range as defined above.

At this time, the reaction conditions are properly designed by depending on $Ar_1$, $Ar_2$, $Ar_2'$, $Ar_3$, $Ar_3'$ and Q, the functional groups of the precursor and specific conditions can be adequately selected and modified by those skilled in the art.

Preferably, the PBO-PI copolymer 1 is designed in the preparation process such that it has a desired molecular weight. Preferably, the weight average molecular weight of Reaction Scheme 1

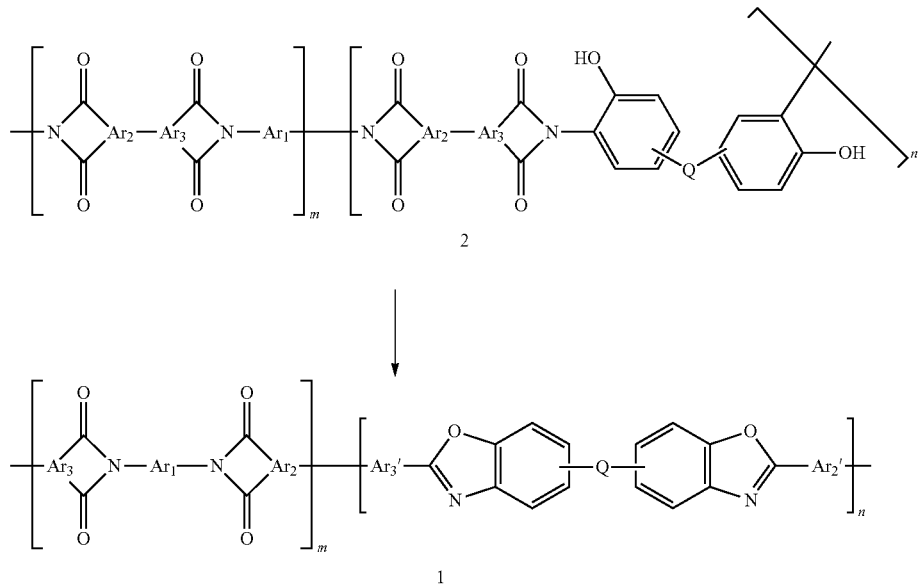

wherein $Ar_1$, $Ar_2$, $Ar_2'$, $Ar_3$, $Ar_3'$, Q, m and n are defined as above.

As shown in Reaction Scheme 1, the poly(hydroxyimide)-polyimide copolymer (hereinafter, referred to as an 'HPI-PI') 2 as the precursor is converted into the PBO-PI copolymer 1 by thermal treatment. The conversion from the HPI-PI copolymer 2 to the PBO-PI copolymer 1 is carried out by removing $CO_2$ present in the poly(hydroxyimide).

After the thermal rearrangement through the thermal treatment, the PBO-PI copolymer 1 undergoes morphological change including reduced density, considerably increased fractional free volume (FFV) due to increased microcavity the PBO-PI copolymer 1 is adjusted to 10,000 to 50,000 Da. When the weight average molecular weight is less than 10,000 Da, physical properties of the copolymer are poor. When the weight average molecular weight exceeds 50,000 Da, the copolymer is poorly soluble in the solvent, thus making it difficult to cast the polymeric membrane.

As depicted in the following Reaction Scheme 2, the polyimide-poly(hydroxyimide) copolymer of Formula 2 is prepared by reacting the compounds of Formulae 3, 4 and 5 as monomers with one another, to prepare polyimide of Formula 6 and poly(hydroxyimide) of Formula 7, and copolymerizing the polyimide of Formula 6 with the poly(hydroxyimide) of Formula 7.

Reaction Scheme 2

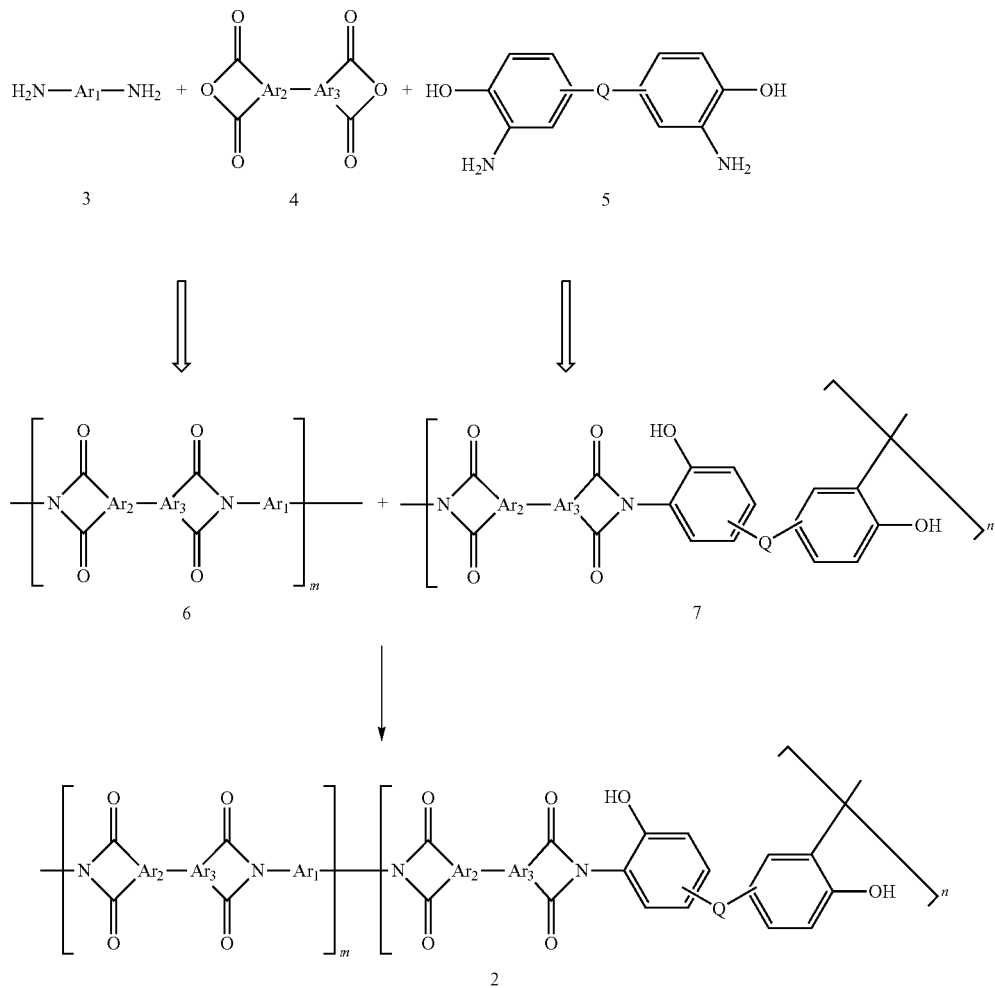

wherein $Ar_1$, $Ar_2$, $Ar_3$, Q, m and n are defined as above.

More specifically, first, a diamine compound 3 and a hydroxy diamine compound 5 as monomers are reacted with an anhydride compound 4 to prepare polyimide 6 and poly (hydroxyimide) 7.

Then, the polyimide 6 is copolymerized with the poly (hydroxyimide) 7 to prepare an HPI-PI copolymer 2 as a precursor.

The polymerization and copolymerization are carried out through a two-step process employing two reactors, or a one-step process employing controlled reaction conditions in one reactor. For example, the polymerization and copolymerization are carried out at 0 to 80° C. for 30 minutes to 12 hours and reaction conditions may be properly controlled by those skilled in the art, depending on the type of the functional groups, i.e., $Ar_1$, $Ar_2$, $Ar_2'$, $Ar_3$, $Ar_3'$ and Q. In addition, the level of copolymerization can be adequately controlled depending on the molar ratio of respective monomers used.

In one embodiment of the present invention, the PBO-PI copolymer of Formula 8 is prepared through the process, as depicted in Reaction Scheme 3 below:

Reaction Scheme 3

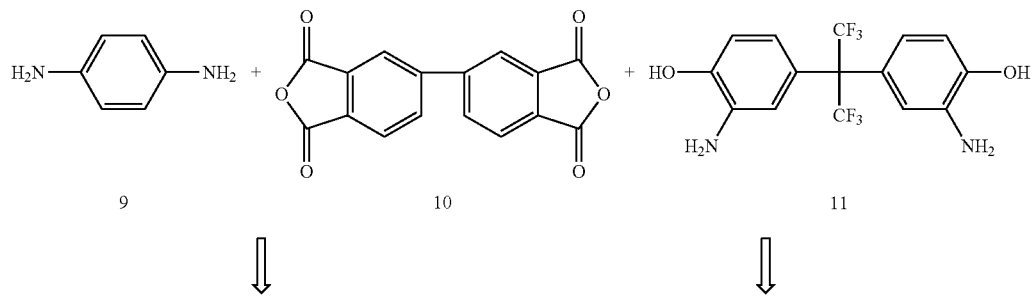

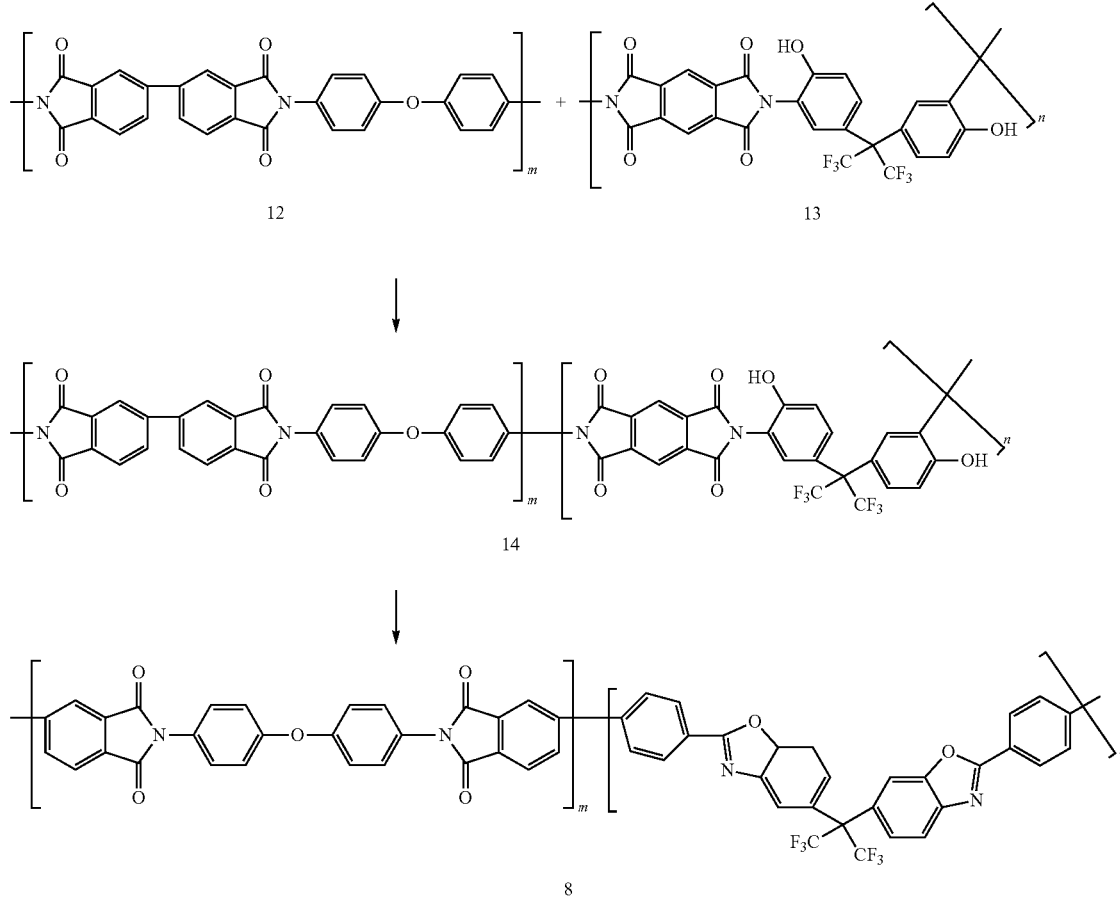

wherein m and n are defined as above.

That is, 4,4'-oxydianiline (ODA) of Formula 9 is reacted with 3,3',4,4'-biphenyltetracarboxylic dianhydride (BPDA) of Formula 10 to polymerize polyimide (PI) of Formula 12, and 2,2'-bis(3-amino-4-hydroxy-phenyl)hexafluoropropane (APAF) of Formula 11 is reacted with 3,3',4,4'-biphenyltetracarboxylic dianhydride (BPDA) of Formula 10 to polymerize poly(hydroxyimide)(HPI) of Formula 13.

Subsequently, polymers of Formulae 12 and 13 are copolymerized to prepare a poly(hydroxyimide)-polyimide copolymer (HPI-PI) precursor of Formula 14, and the precursor 14 is thermally treated to prepare a PBO-PI copolymer of Formula 8.

In another aspect, the present invention is directed to a gas separation membrane comprising the polyimide-polybenzoxazole copolymer of Formula 1 below:

The PBO-PI copolymer contains a plurality of aromatic rings in the molecular structure thereof. For this reason, the PBO-PI copolymer has a structure in which copolymer chains are packed such that they are spaced from one another by a predetermined distance and has a rigid-rod structure due to its limited mobility.

Accordingly, the gas separation membrane prepared from the copolymer can endure not only mild conditions, but also harsh conditions, e.g., long operation time, acidic conditions and high humidity.

In addition, the PBO-PI copolymer has a specific surface area of over 0.1 and under 480 $m^2/g$, a total pore volume of 0.0004 to 0.25 $m^3$ and a pore size of 21 to 40 Å. In addition, the PBO-PI copolymer exhibits excellent permeability of $CO_2$, $O_2$, $N_2$ and $CH_4$ and superior selectivity for mixed gas pair of $O_2/N_2$, $CO_2/CH_4$, $CO_2/N_2$ and $N_2/CH_4$.

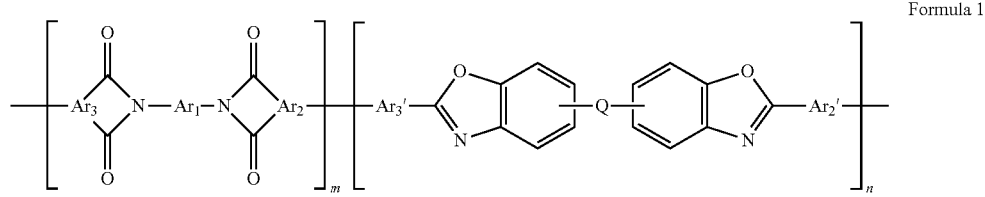

Formula 1 wherein $Ar_1$, $Ar_2$, $Ar_2'$, $Ar_3$, $Ar_3'$, Q, m and n are defined as above.

In preferred embodiments of the present invention, the PBO-PI copolymer membrane has well-connected microcavities and shows linear increases in volume, FFV and d-spacing with an increase of the copolymerization ratio of PBO present therein. In addition, for permselectivity of $O_2/N_2$ and $CO_2/CH_4$, the PBO-PI copolymer membrane surpasses the upper bound line of common polymers for gas separation membrane applications.

In another aspect, the present invention is directed to a method for preparing a gas separation membrane comprising the PBO-PI copolymer of Formula 1, by casting the HPI-PI copolymer of Formula 2, followed by thermal treatment.

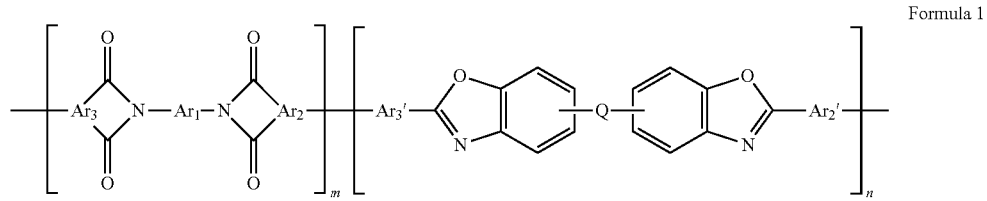

Formula 1 wherein $Ar_1$, $Ar_2$, $Ar_2'$, $Ar_3$, $Ar_3'$, Q, m and n are defined as above.

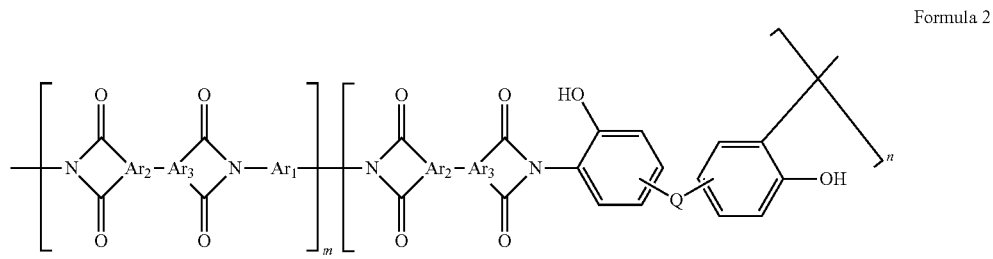

Formula 2 wherein $Ar_1$, $Ar_2$, $Ar_3$, Q, m and n are defined as above.

More specifically, the HPI-PI copolymer precursor of Formula 2, is prepared as a solution, is coated or cast into films or fibers (in particular, hollow fibers), and is then subjected to thermal treatment to prepare the gas separation membrane comprising the PBO-PI copolymer of Formula 1.

That is, the gas separation membrane has advantages in that the gas separation membrane can be directly prepared from the precursor without using any additional dissolving process to prepare the separation membrane and can thus be readily prepared in various forms. Another advantage of the gas separation membrane is that physical properties can be controlled by addition of other additives, if necessary.

MODE FOR INVENTION

Hereinafter, preferred examples will be provided for a further understanding of the invention. These examples are for illustrative purposes only and are not intended to limit the scope of the present invention.

Example 1

A polyimide-polybenzoxazole (PBO-PI) copolymer represented by Formula 8 was prepared in the manner as depicted in Reaction Scheme 3 above.

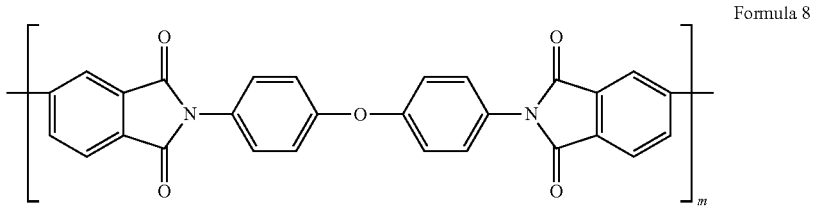

Formula 8

-continued

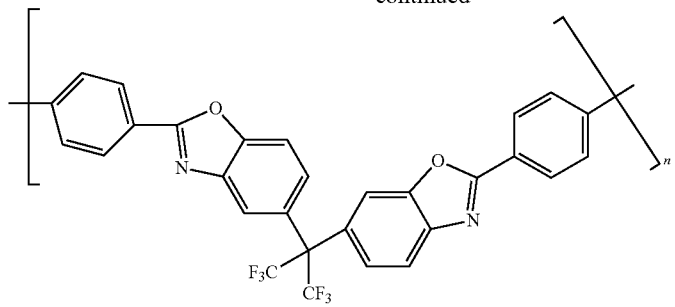

5 mmol of 4,4'-oxydianiline (ODA, Aldrich, Milwaukee, Wis., USA) and 5 mmol of 2,2'-bis(3-amino-4-hydroxy-phenyl)hexafluoropropane (APAF, Tokyo Kasei Co., Inc., Tokyo, Japan)) as diamine monomers were dissolved in NMP in a 100 ml flask under nitrogen purging. To the resulting diamine solution 10 mmol of 3,3',4,4'-biphenyltetracarboxylic dianhydride (BPDA, Aldrich, Milwaukee, Wis., USA) was added to and the mixture was then homogeneously mixed.

The mixture solution was allowed to react at 25° C. for 3 hours to polymerize polyimide (PI) and polyhydroxyimide (HPI) and was then further allowed to react at 250° C. for 24 hours to prepare a poly(hydroxyimide)-polyimide (HPI-PI) copolymer precursor.

Subsequently, the poly(hydroxyimide)-polyimide copolymer (HPI-PI) solution precursor was cast onto a glass substrate and then dried at 250° C. to obtain a precursor membrane. The membrane was subjected to thermal treatment at 450° C. for 60 minutes to prepare a polyimide-polybenzoxazole copolymer (PBO-PI (5:5)) membrane.

Example 2

An HPI-PI precursor membrane and a PBO-PI copolymer membrane were prepared in the same manner as in Example 1 except that a molar ratio of ODA to APAF was controlled such that a copolymerization ratio of PBO to PI was adjusted to 2:8, to obtain the HPI-PI (2:8) precursor membrane and the PBO-PI (2:8) copolymer membrane.

Example 3

An HPI-PI precursor membrane and a PBO-PI copolymer membrane were prepared in the same manner as in Example 1 except that a molar ratio of ODA to APAF was controlled such that a copolymerization ratio of PBO to PI was adjusted to 8:2, to obtain the HPI-PI (8:2) precursor membrane and the PBO-PI (8:2) copolymer membrane.

Comparative Example 1

A polyimide membrane with a ratio of PBO to PI of 0:10 was prepared in the same manner as in Example 1 except that only ODA was used as the diamine monomer.

Comparative Example 2

A polybenzoxazole membrane with a ratio of PBO to PI of 10:0 was prepared in the same manner as in Example 1 except that only APAF was used as the diamine monomer.

The membranes were prepared as set forth in Table 1 below in accordance with the methods disclosed in the Examples and Comparative Examples. For these membranes, component analysis, physical properties and gas permeability were characterized.

TABLE 1

| Precursor membranes | Polymer membranes |
|---|---|
| HPI:PI (0:10) | PBO-PI (0:10) |
| HPI:PI (2:8) | PBO-PI (2:8) |
| HPI:PI (5:5) | PBO-PI (5:5) |
| HPI:PI (8:2) | PBO-PI (8:2) |
| HPI:PI (10:0) | PBO-PI (10:0) |

Experimental Example 1

FT-IR Analysis

In order to characterize precursor and polymer membranes, ATR-FTIR spectra were obtained using an Infrared Microspectrometer (IlluminatIR, SensIR Technologies, Danbury, Conn., USA).

Figure 2:
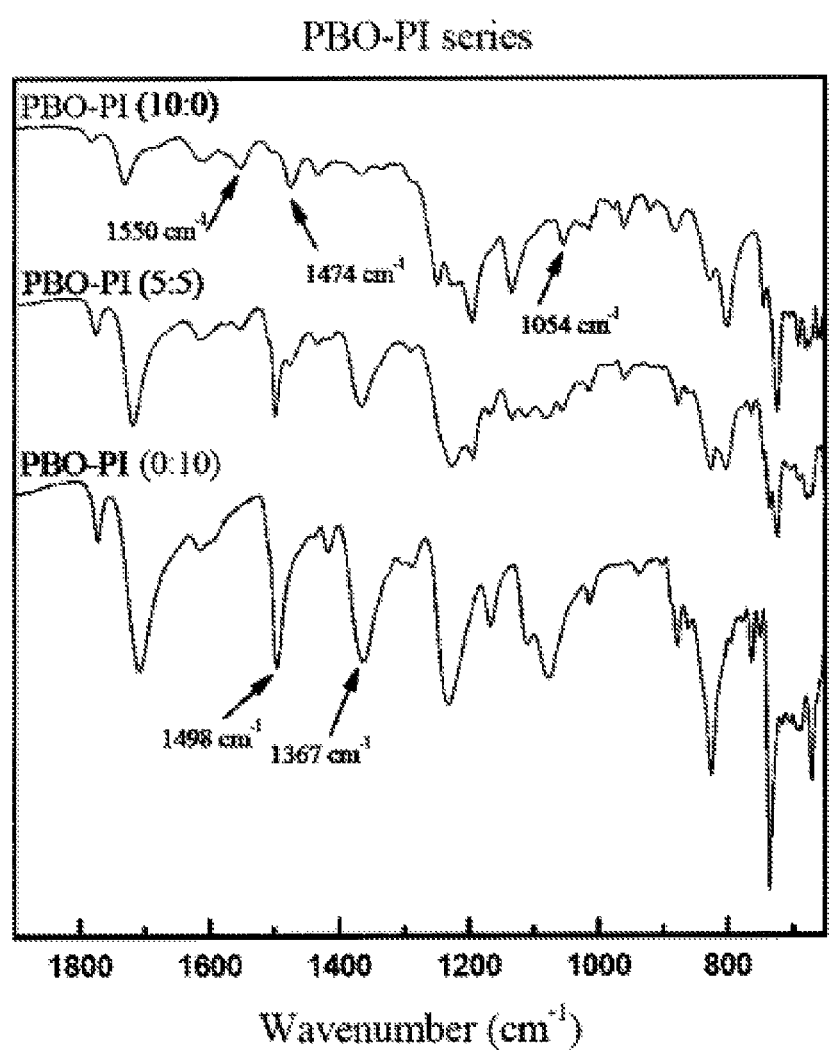
FIG. 2 is FT-IR spectra of PBO-PI copolymer membranes prepared at various copolymerization ratios.

FIG. 1 is FT-IR spectra of HPI-PI precursor membranes prepared at various copolymerization ratios. FIG. 2 is FT-IR spectra of PBO-PI copolymer membranes prepared at various copolymerization ratios.

As can be seen from FIG. 1, imide peaks were observed at 1,778 cm$^{-1}$ ($\upsilon$(C=O), in-phase, imide) and 1,705 cm$^{-1}$ ($\upsilon$(C=O), out-of-phase, imide). Characteristic peaks of C—F bonds, APAF functional groups, stretched at 1,246, 1,196 and 1,151 cm$^{-1}$, as the HPI content increases. In addition, C—H vibrations, out of the plane of the aromatic ring, from APAF functional group were observed at 986 cm$^{-1}$ and 963 cm$^{-1}$ corresponding to typical 1,2,4-tri substituted aromatic ring structure in the case of HPI-PI (10:0) and HPI-PI (5:5).

As shown in FIG. 2, characteristic benzoxazole peaks are observed at 1,550, 1,480 and 1,054 cm$^{-1}$. In addition, the difference in C—H stretching bands due to the change in molar ratio of ODA and APAF was observed from the disappearance of stretching bands at 1,498 and 1,367 cm$^{-1}$ from ODA and appearance of the band at 1,474 cm$^{-1}$ from APAF.

Experimental Example 2

Thermogravimetric Analysis/Mass Spectroscopy (TGA-MS)

The precursor membranes as set forth in Table 1 above were subjected to thermogravimetric analysis/mass spectroscopy (TGA-MS) to confirm $CO_2$ evolution. The TGA-MS was carried out using TG 209 F1 Iris and QMS 403C Aeolos (NETZSCH, Germany), while injecting Ar into each precursor membrane. The results thus obtained are shown in FIG. 3.

Figure 3:
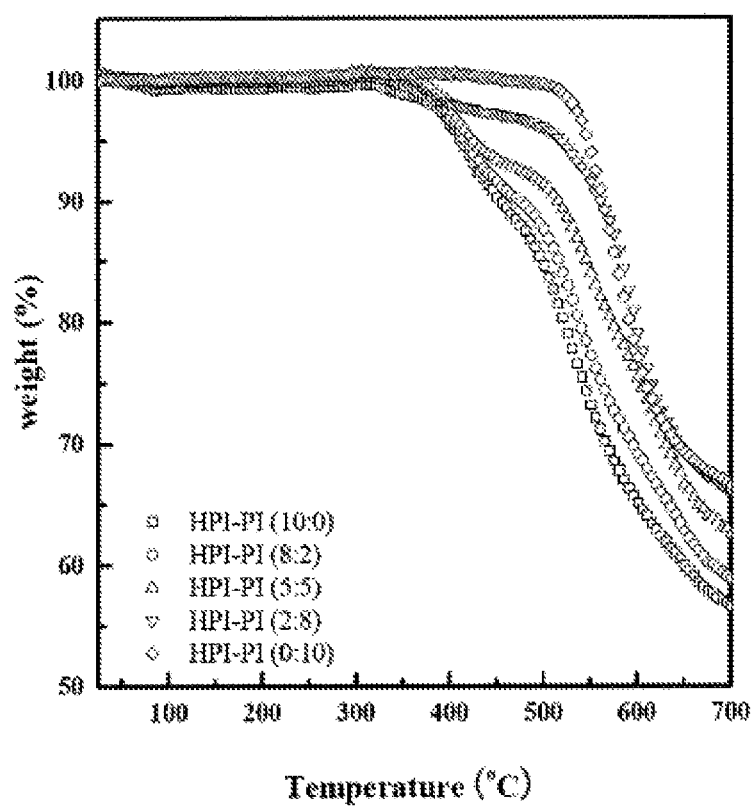
FIG. 3 is a TGA thermogram of HPI-PI precursor membranes prepared at various copolymerization ratios.

FIG. 3 is a TGA thermogram of HPI-PI precursor membranes produced at various copolymerization ratios.

As can be seen from FIG. 3, the precursor membrane began to decompose at a thermal conversion temperature of 350 to 500° C. The decomposition product was subjected to MS to confirm the presence of $CO_2$.

Figure 4:
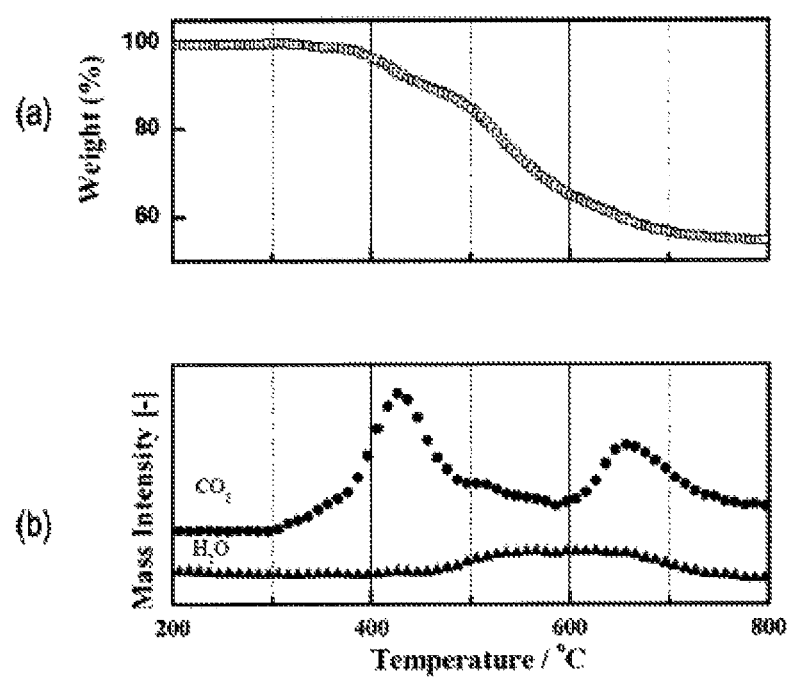
FIG. 4 is a TGA-MS thermogram of an HPI-PI (10:0) precursor membrane.
Figure 5:
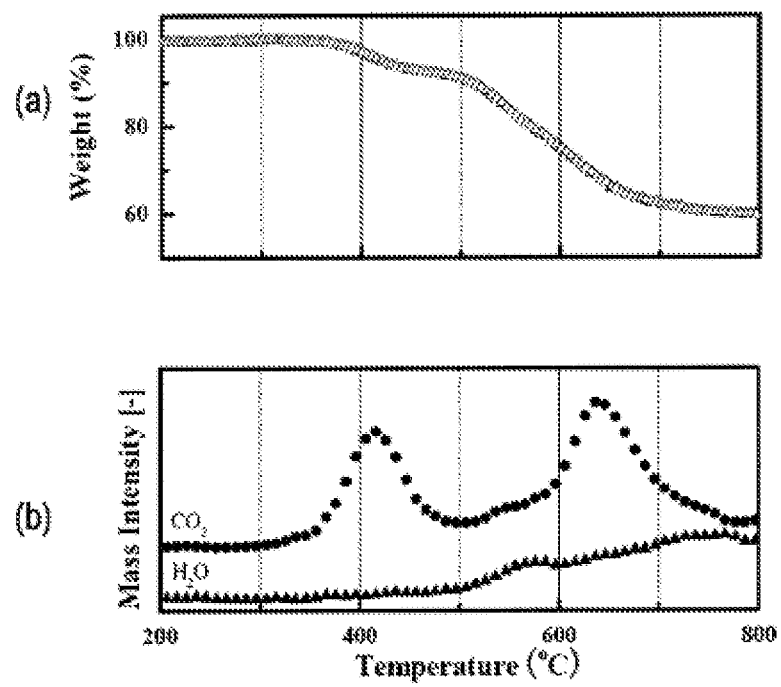
FIG. 5 is a TGA-MS thermogram of an HPI-PI (5:5) precursor membrane.
Figure 6:
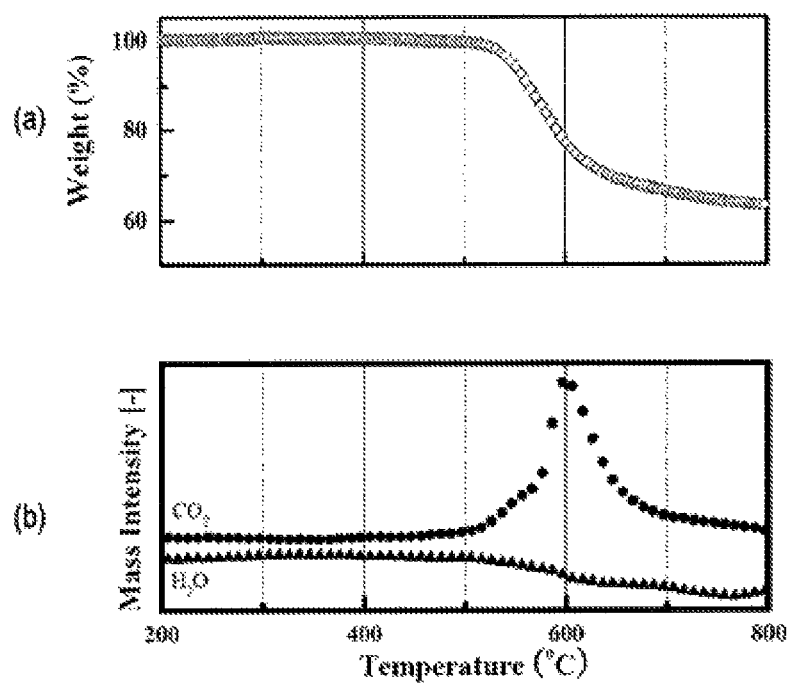
FIG. 6 is a TGA-MS thermogram of an HPI-PI (0:10) precursor membrane.

FIGS. 4 to 6 are TGA-MS thermograms of HPI-PI precursor membranes prepared at various copolymerization ratios. Specifically, FIG. 4 is a TGA-MS thermogram of an HPI-PI (10:0) precursor membrane, FIG. 5 is a TGA-MS thermogram of an HPI-PI (5:5) precursor membrane, and FIG. 6 is a TGA-MS thermogram of an HPI-PI (0:10) precursor membrane.

It can be seen from FIGS. 4 to 6 that as the amount of PI present in the copolymer increases, the thermal conversion temperature increases.

Experimental Example 3

Ultraviolet-Visible (UV-VIS) Spectroscopy

The precursor and polymer membranes as set forth in Table 1 were subjected to UV-VIS spectroscopy using an S-3100 (Seoul, Korea) diode array type spectrophotometer to obtain UV-VIS spectra. At this time, UV irradiation was carried out using a mercury lamp without using any filter. The sample was allowed to cool in air during the UV irradiation.

Figure 7:
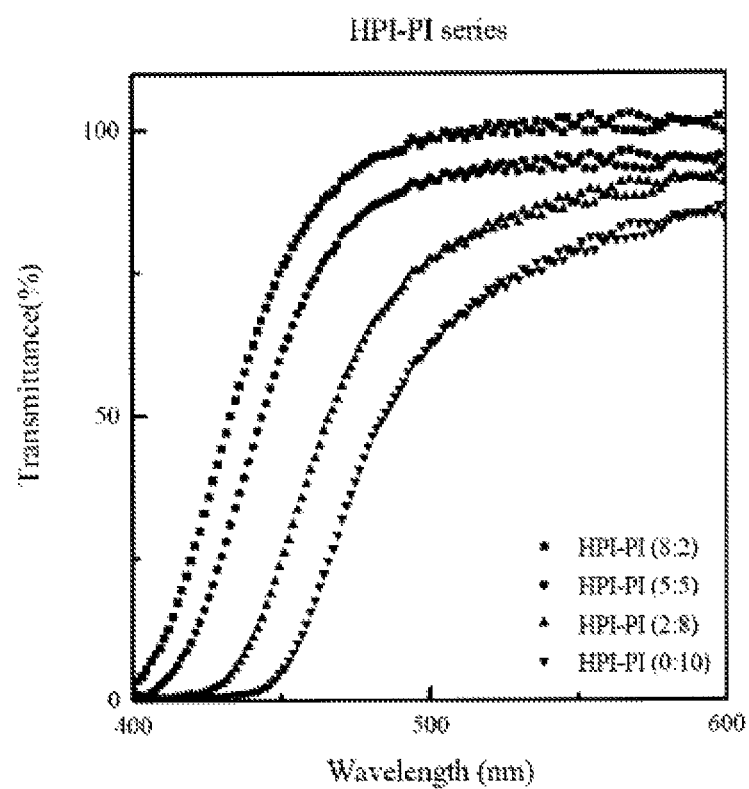
FIG. 7 is UV/VIS spectra of HPI-PI precursor membranes according to various copolymerization ratios.
Figure 8:
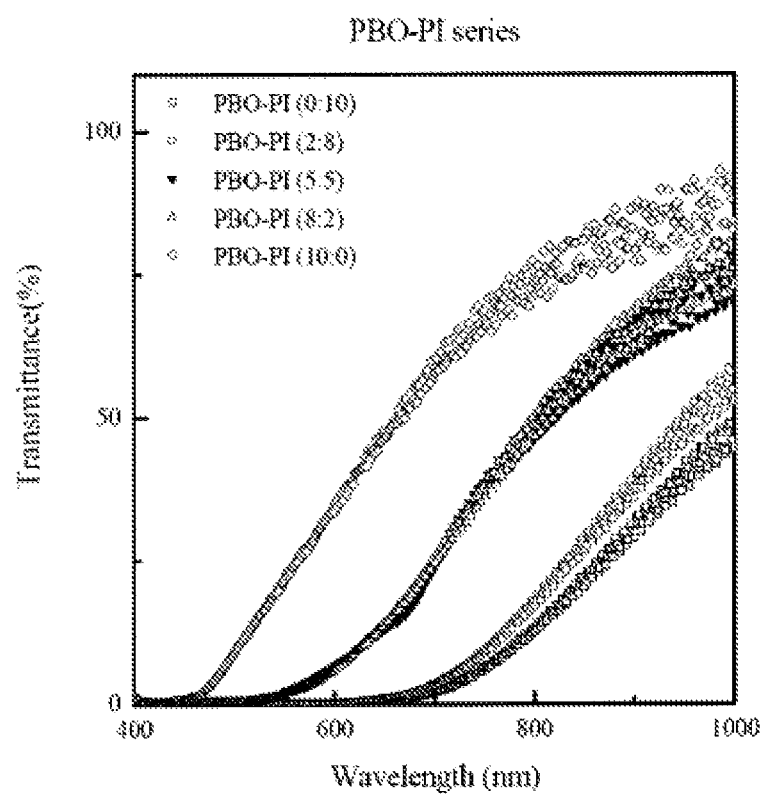
FIG. 8 is UV/VIS spectra of PBO-PI copolymer membranes prepared at various copolymerization ratios.

FIG. 7 is UV/VIS spectra of HPI-PI precursor membranes prepared at various copolymerization ratios. FIG. 8 is UV/VIS spectra of PBO-PI copolymer membranes prepared at various copolymerization ratios.

As shown in FIGS. 7 and 8, the precursor and copolymer membranes absorb intense visible light due to their conjugated aromatic structure and intramolecular or intermolecular charge-transfer complexes (CTCs) created between or within the polymer chains, thus rendering polymer colors from pale yellow to dark brown.

It can be seen from FIG. 7 that the PI domain increases, i.e., a PI copolymerization ratio increases, the cut-off wavelength increases, but the transmittance (%) decreases. This behavior can be explained from the fact that the electron-donating ether groups present in ODA diamine and the electron-withdrawing $CF_3$ group present in APAF diamine were presumably effective in decreasing charge transfer complexes between polymer chains through steric hindrance and inductive effects.

It can be confirmed from FIG. 8 that after PBO conversion was completed by thermal rearrangement reaction in PBO-PI copolymers, the cutoff wavelength of PBO-PI copolymers shifted to a higher wavelength than that in the HPI-PI state, while the transmittance was severely reduced.

Experimental Example 4

X-ray Diffraction (XRD) Analysis

The precursor and polymer membranes as set forth in Table 1 above were subjected to X-ray diffraction using a wide angle X-ray diffractometer (D/MAX-2500, Rigaku, Japan) operating with a scanning rate 5°/min at 2θ of 5 to 60°, to obtain X-ray diffraction patterns.

Figure 9:
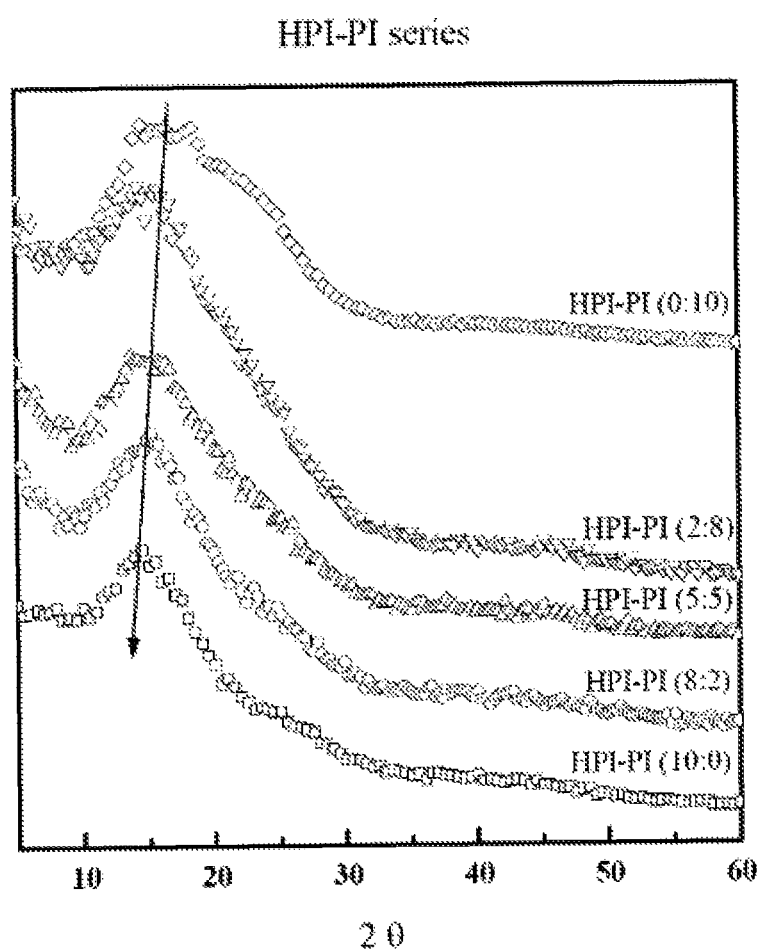
FIG. 9 is X-ray diffraction patterns of HPI-PI precursor membranes prepared at various copolymerization ratios.
Figure 10:
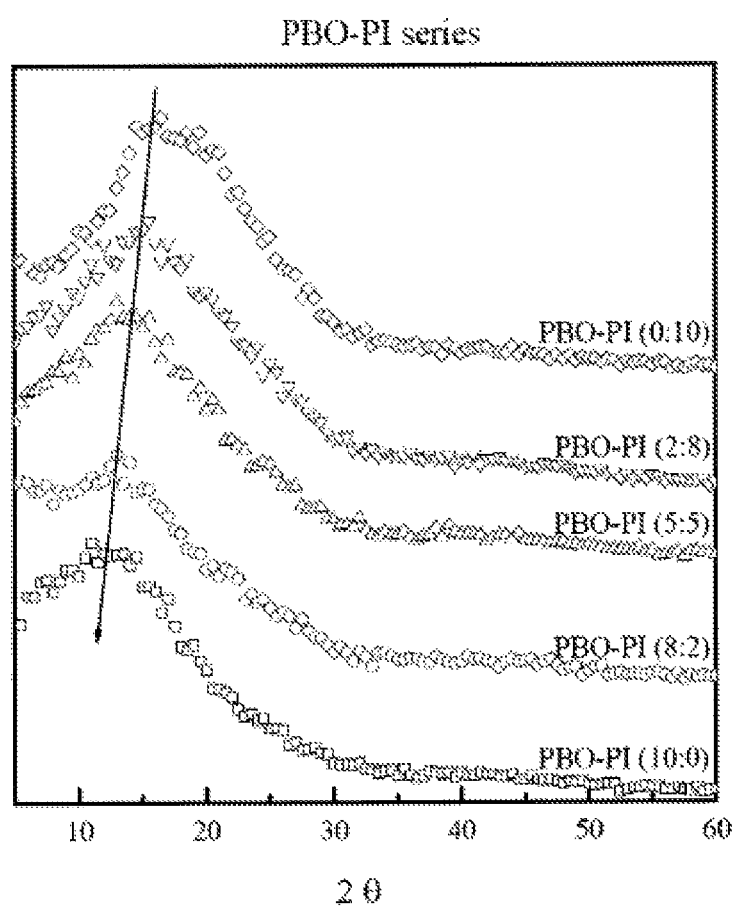
FIG. 10 is X-ray diffraction patterns of PBO-PI copolymer membranes prepared at various copolymerization ratios.

FIG. 9 is X-ray diffraction patterns of HPI-PI precursor membranes prepared at various copolymerization ratios. FIG. 10 is X-ray diffraction patterns of PBO-PI copolymer membranes prepared at various copolymerization ratios.

As apparent from FIGS. 9 and 10, the precursor and copolymer membranes are amorphous, and as the APAF content increases, the peak center of 2θ shifts to lower values. In the case where the precursor and copolymer membranes are copolymerized in the same amount, 2θ of the copolymer membrane shifts to lower values.

This shift behavior means that thermal conversion of HPI results in rearrangement of PBO molecules, causing an increase in d-spacing between the PBO molecules. The increase in d-spacing is attributed to the fact that bulky groups such as hexafluoroisopropylidene linkages present in APAF diamine affect this morphological change because of reduced intra- and interpolymeric chain interactions, resulting in loose polymer chain packaging and aggregates.

Experimental Example 5

Physical Properties

The physical properties of the precursor and polymer membranes shown in Table 1 above were measured.

First, density of the membranes was measured by a buoyancy method using a Sartorius LA 120S analytical balance. The fractional free volume (FFV, $V_f$) was calculated from the data in accordance with Equation 1 below [W. M. Lee. Selection of barrier materials from molecular structure. *Polym Eng Sci.* 1980; 20:65-9].

$$FFV = \frac{V - 1.3 Vw}{V} \quad \text{Equation 1}$$

wherein V is the polymer specific volume and $V_W$ is the specific Van der Waals volume. The Van der Waals volume was estimated by a Cerius 4.2 program using a synthia module based on the work of J. Bicerano [J. Bicerano. Prediction of polymer properties, Third Edition. Marcel Dekker Inc. 2002].

The d-spacing was calculated in accordance with Bragg's equation from X-ray diffraction pattern results of Experimental Example 4.

TABLE 2

| Type | $V_w$ (cm³/g) | Density (g/cm³) | Volume (V, cm³/g) | FFV ($V_f$) | d-spacing (nm) |
|---|---|---|---|---|---|
| HPI-PI(0:10) | 0.4979 | 1.3961 | 0.7163 | 0.0964 | 0.5419 |
| HPI-PI(5:5) | 0.4739 | 1.4200 | 0.7042 | 0.1251 | 0.5981 |
| HPI-PI(10:0) | 0.4563 | 1.4418 | 0.6936 | 0.1448 | 0.6155 |
| PBO-PI(0:10) | 0.4979 | 1.3873 | 0.7208 | 0.1020 | 0.5411 |
| PBO-PI(5:5) | 0.4799 | 1.3530 | 0.7391 | 0.1559 | 0.6447 |
| PBO-PI(10:0) | 0.4645 | 1.1267 | 0.8875 | 0.3196 | 0.7180 |

As can be seen from Table 2, all of the precursor and polymer membranes showed increased d-spacing and FFV due to bulky $CF_3$ groups of an APAF moiety, as the APAF content increases.

In particular, after conversion to PBO, FFV of PBO-PI (10:0) was two or more times higher than that of HPI-PI (10:0) due to the decrease in density of the PBO-PI series after thermal treatment. In addition, HPI-PI (0:10) and PBO-PI (0:10) do not show any significant difference in physical properties before and after the thermal treatment, because there is no space in which rearrangement of polymer structures induced by heterocyclic ring modification occurs.

On the other hand, the PBO-PI (5:5) copolymer membrane according to the present invention has an FFV of 0.1559 and a d-spacing of 0.6447 nm. The FFV and d-spacing of the PBO-PI (5:5) copolymer membrane are in the range from those of PBO-PI (0:10) (i.e., PBO homopolymer) to those of PBO-PI (10:0) (i.e., PI homopolymer), and affect permeability and selectivity of the gas separation membrane.

Experimental Example 6

Adsorption and Desorption Isotherm Analysis

This experiment was performed to determine $N_2$ adsorption/desorption characteristics of the PBO-PI copolymer membranes shown in Table 1. $N_2$ adsorption isotherms of the PBO-PI polymer membranes were measured by a BET method. The results thus obtained are shown in FIG. 11.

Figure 11:
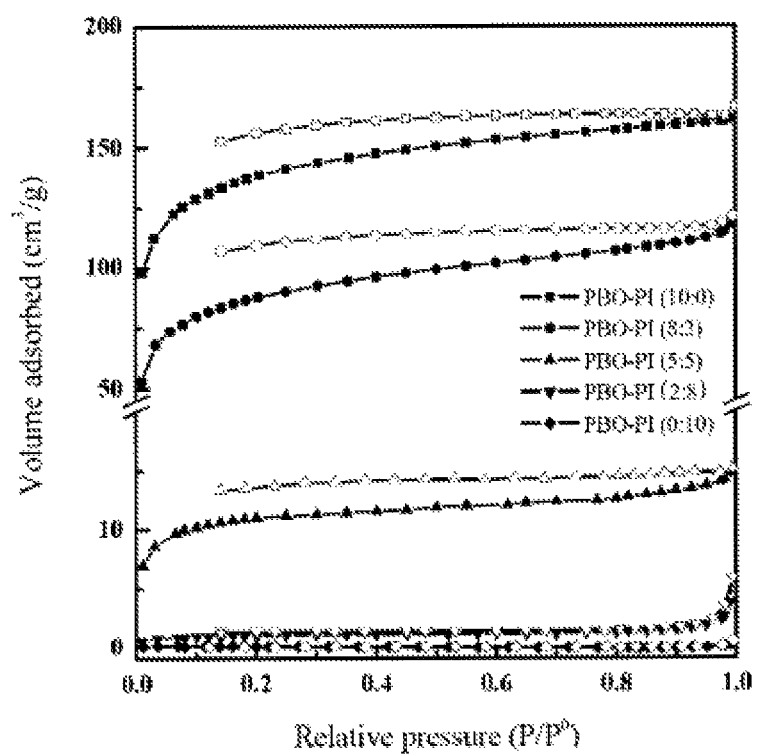
FIG. 11 is $N_2$ adsorption/desorption isotherms of PBO-PI copolymer membranes prepared at various copolymerization ratios.

FIG. 11 is $N_2$ adsorption/desorption isotherms of PBO-PI copolymer membranes prepared at various copolymerization ratios.

As can be seen from FIG. 11, no micropores are observed in the PBO-PI (0:10) (i.e., PI homopolymer) membrane, which means non-occurrence of $N_2$ adsorption. In addition, the amount of adsorbed nitrogen increases, as the amount of PBO present in the PBO-PI copolymer membrane increases. This means that the number of micropores created is proportional to the amount of thermal conversion from HPI to PBO.

In order to realize more precise characterization, the pore volume of PBO-PI copolymer membranes was measured using a specific surface area and pore analyzer (ASAP2020, Micromeritics, Ga., USA). At this time, the copolymer membranes were transferred to pre-weighed analytic tubes which were capped with Transeal™ to prevent permeation of oxygen and atmospheric moisture during transfers and weighing. The copolymer membranes were evacuated under dynamic vacuum up to 300° C. until an outgas rate was less than 2 mTorr/min. The results are shown in Table 3 below.

TABLE 3

|  | PBO-PI (10:0) | PBO-PI (8:2) | PBO-PI (5:5) | PBO-PI (2:8) | PBO-PI (0:10) |
|---|---|---|---|---|---|
| Specific surface area ($m^2$/g)(P/Po = 0.2) | 480 | 304 | 38 | 4 | 0.1 |
| Pore volume ($m^3$) (P/Po = 0.97) | 0.25 | 0.18 | 0.02 | 0.004 | — |
| Pore size (Å) | 20.87 | 22.98 | 22.78 | 37.81 | — |

As can be seen from Table 3, the specific surface area and pore volume of the PBO-PI copolymer membranes were gradually increased from 0.1 to 480 $m^2$/g and from 0.004 to 0.25 $m^3$, respectively, as the amount of PBO present in the PBO-PI copolymer membrane increases. These values are higher than those of common polymers for separation membrane material applications, and comparable to conventional adsorbents such as activated carbon, zeolites and microporous alumina.

Meanwhile, the PBO-PI (10:0) (i.e., PBO homopolymer) membrane has a large specific surface area and a small pore size, as compared to PBO-PI (8:2), PBO-PI (5:5) and BO-PI (4:8) membranes. These results demonstrate that the size of PBO-PI copolymers can be adjusted to a desired level by controlling the copolymerization ratio between PBO and PI blocks of the PBO-PI copolymers.

Experimental Example 7

Measurement of Permeability and Permselectivity

This experiment was carried out in the following manner to determine gas permeability and gas permselectivity of the PBO-PI copolymer membranes.

The gas permeability of single gases such as $CO_2$, $O_2$, $N_2$ and $CH_4$ was measured by a time-lag method, which was carried out at various temperatures under a pressure of 760 Torr. Permselectivity of gas pair such as $O_2/N_2$ and $CO_2/N_2$ was calculated from the ratio of single gas permeability. The results are shown in FIG. 12 and Table 4.

Figure 12:
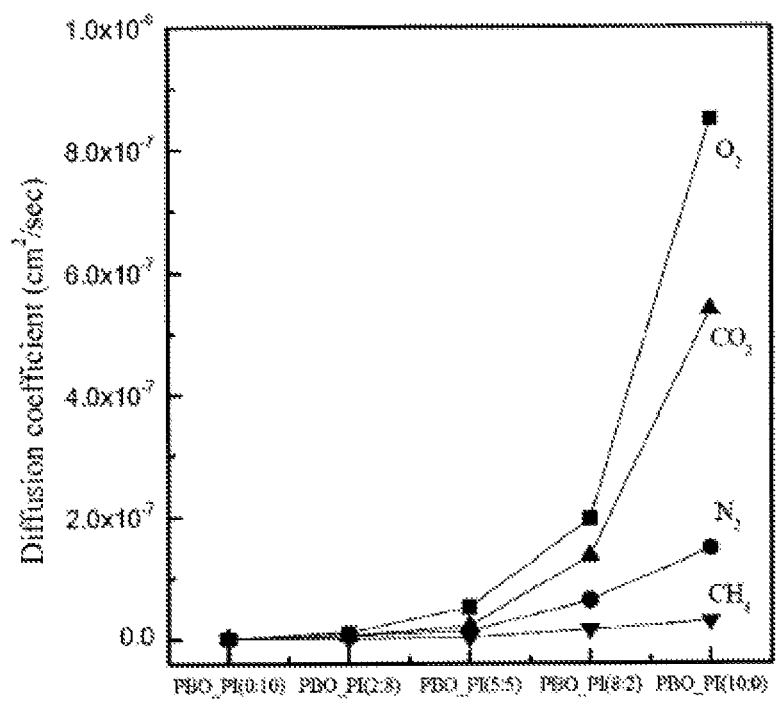
FIG. 12 is a graph showing a diffusion coefficient of PBO-PI copolymer membranes for $O_2$, $CO_2$, $N_2$ and $CH_4$ as single gases.

FIG. 12 is a graph showing a diffusion coefficient of PBO-PI copolymer membranes for $O_2$, $CO_2$, $N_2$ and $CH_4$ as single gases.

It can be seen from FIG. 12 that the diffusion coefficient of the PBO-PI copolymer membrane is proportional to the amount of PBO present in the PBO-PI copolymer. This behavior indicates that improved gas permeability is attributed to the micropores created by PBO.

TABLE 4

|  | PBO-PI (10:0) | PBO-PI (2:8) | PBO-PI (5:5) | PBO-PI (8:2) | PBO-PI (0:10) |
|---|---|---|---|---|---|
| Permeability [Barrer] | | | | | |
| $CO_2$ | 0.69 | 11.41 | 251.87 | 388.90 | 1295.75 |
| $O_2$ | 0.17 | 2.24 | 12.47 | 106.58 | 515.61 |
| $N_2$ | 0.03 | 0.40 | 2.52 | 25.34 | 82.66 |
| $CH_4$ | 0.02 | 0.30 | 1.81 | 20.08 | 33.52 |
| Permselectivity | | | | | |
| $O_2/N_2$ | 5.4 | 5.7 | 4.9 | 4.2 | 6.2 |
| $CO_2/CH_4$ | 32.4 | 38.2 | 28.6 | 19.4 | 38.7 |

As can be seen from Table 4, all gas species showed considerably increased gas permeability according to a ratio of a thermally converted domain to a stable domain. After being fully converted from HPI to PBO (PBO-PI (10:0)), permeabilities of all tested gases were around 1,500 times higher than annealed pure polyimide (PBO-PI (0:10)) without any significant selectivity loss. The increase in gas permeability corresponds to the FFV values (See Table 2) and is caused by microcavities created during thermal modification in a solid state.

Figure 13:
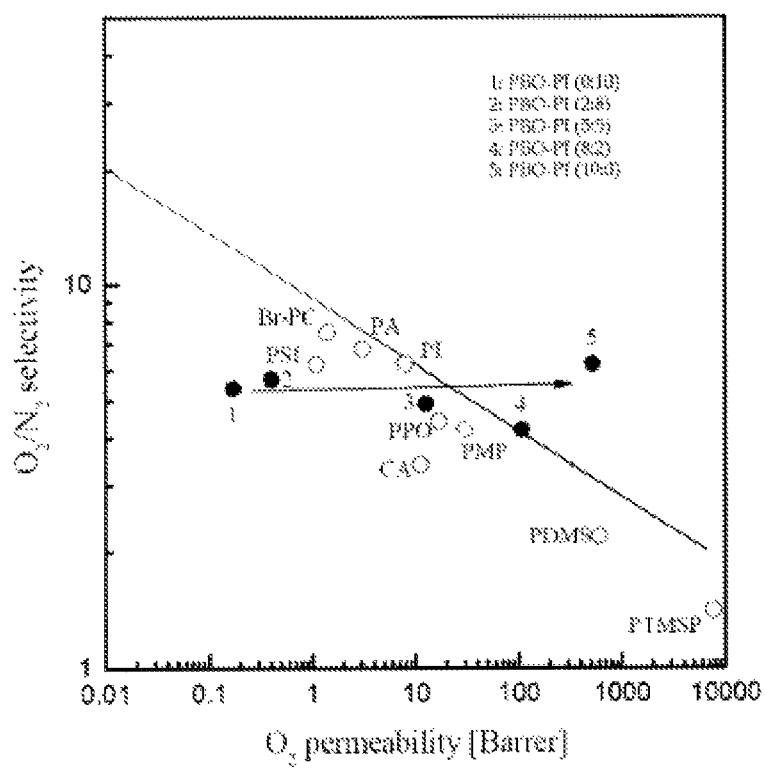
FIG. 13 is a graph showing $O_2/N_2$ permselectivity of the PBO-PI copolymer membrane and common polymers as a function of $O_2$ permeability.
Figure 14:
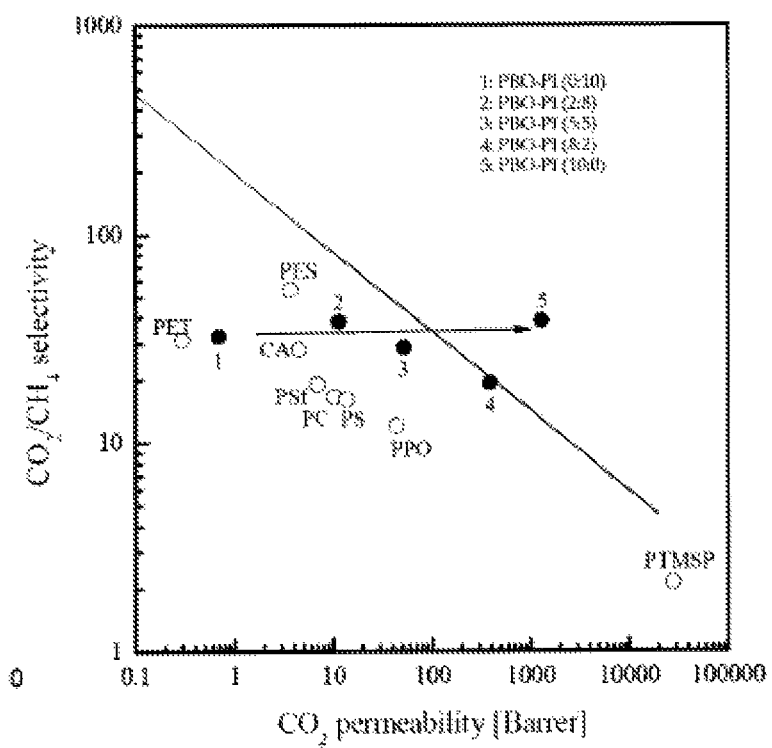
FIG. 14 is a graph showing $CO_2/CH_4$ permselectivity of the PBO-PI copolymer membrane and common polymers as a function of $CO_2$ permeability.

FIG. 13 is a graph showing $O_2/N_2$ permselectivity of the PBO-PI copolymer membrane and conventional polymers as a function of $O_2$ permeability. FIG. 14 is a graph showing $CO_2/CH_4$ permselectivity of the PBO-PI copolymer membrane and conventional polymers as a function of $CO_2$ permeability. In FIGS. 13 and 14, PET indicates poly(ethylene terephthalate), PSf indicates polysulfone, CA indicates cellulose acetate, PC indicates polycarbonate, PS indicates polystyrene, PPO indicates poly(phenylene oxide), PTMSP indicates poly(1-trimethylsilyl-1-propyne), PA indicates polyamide, PI indicates polyimide, PMP indicates poly(4-methyl-2-pentyne), and PDMS indicates polydimethylsiloxane.

As apparent from FIGS. 13 and 14, the PBO-PI copolymer membrane according to the present invention has well-connected microcavities, which are linearly increased, as the amount of PBO present in the copolymer increases.

Although PTMSP shows still higher $O_2$ and $CO_2$ permeability, it does not surpass the upper bound line owing to low gas selectivity. However, selectivity for important gas pair (e.g., $O_2/N_2$ and $CO_2/CH_4$) of the PBI-PI copolymer membranes according to the present invention is much higher than that of PTMSP.

INDUSTRIAL APPLICABILITY

As apparent from the foregoing, the PBO-PI copolymer according to the present invention can readily rendered into gas separation membranes in various forms including flat-sheets, hollow fibers and organic-inorganic complexes from highly soluble precursors. The gas separation membrane thus prepared can endure harsh conditions such as long operation time, acidic conditions and high humidity due to the rigid polymer backbone thereof.

The invention claimed is:

1. A polyimide-polybenzoxazole (PBO-PI) copolymer having repeating units represented by Formula 1 below:

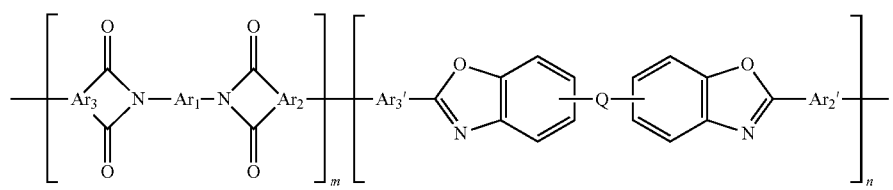

Formula 1 wherein $Ar_1$, $Ar_2'$ and $Ar_3'$ are identical or different, are each independently a bivalent $C_5$-$C_{24}$ arylene group or a bivalent $C_5$-$C_{24}$ heterocyclic ring which is substituted or unsubstituted with at least one substituent selected from the group consisting of $C_1$-$C_{10}$ alkyl, $C_1$-$C_{10}$ alkoxy, $C_1$-$C_{10}$ haloalkyl and haloalkoxy, or two or more of which are fused together to form a condensation ring, or covalently bonded to each other via a functional group selected from the group consisting of O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$ and C(=O)NH;

$Ar_2$ and $Ar_3$ are identical or different, are each independently a trivalent $C_5$-$C_{24}$ arylene group or a trivalent $C_5$-$C_{24}$ heterocyclic ring which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring, or covalently bonded to each other via a functional group selected from the group consisting of O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$ and C(=O)NH;

Q is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, C(=O)NH, C(CH$_3$)(CF$_3$), or $C_1$-$C_6$ alkyl-substituted phenyl or $C_1$-$C_6$ haloalkyl-substituted phenyl in which Q is linked to opposite both phenyl rings in the position of m-m, m-p, p-m or p-p;

m is an integer of 10 to 400; and n is an integer of 10 to 400.

2. The copolymer according to claim 1, wherein $Ar_1$, $Ar_2'$ and $Ar_3'$ are selected from the following compounds:

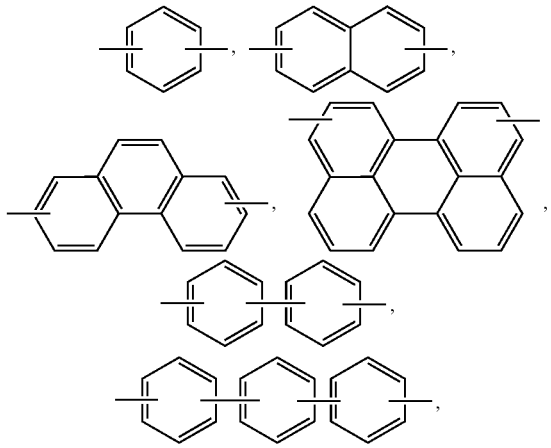

-continued

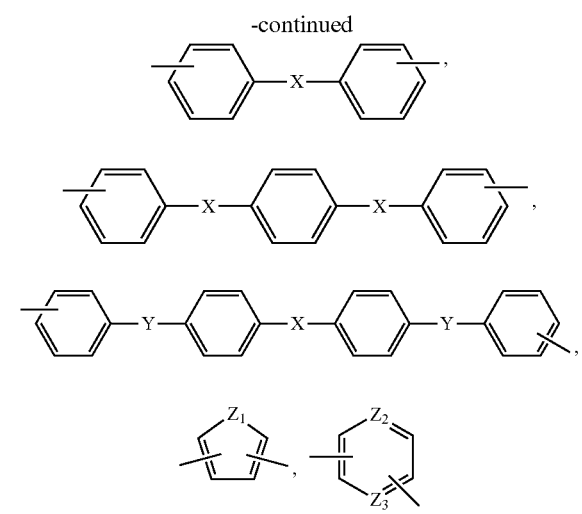

wherein X is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, or C(=O)NH; Y is O, S or C(=O); and $Z_1$, $Z_2$ and $Z_3$ are identical or different and are O, N or S.

3. The copolymer according to claim 1, wherein $Ar_1$, $Ar_2'$ and $Ar_3'$ are selected from the following compounds:

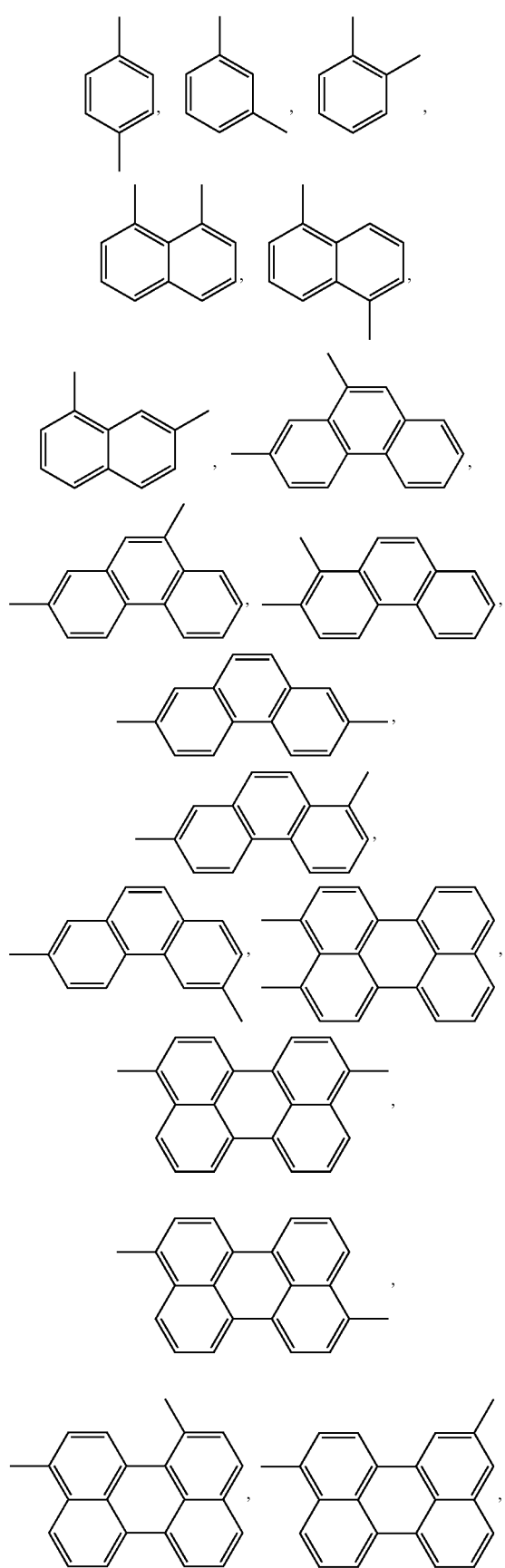
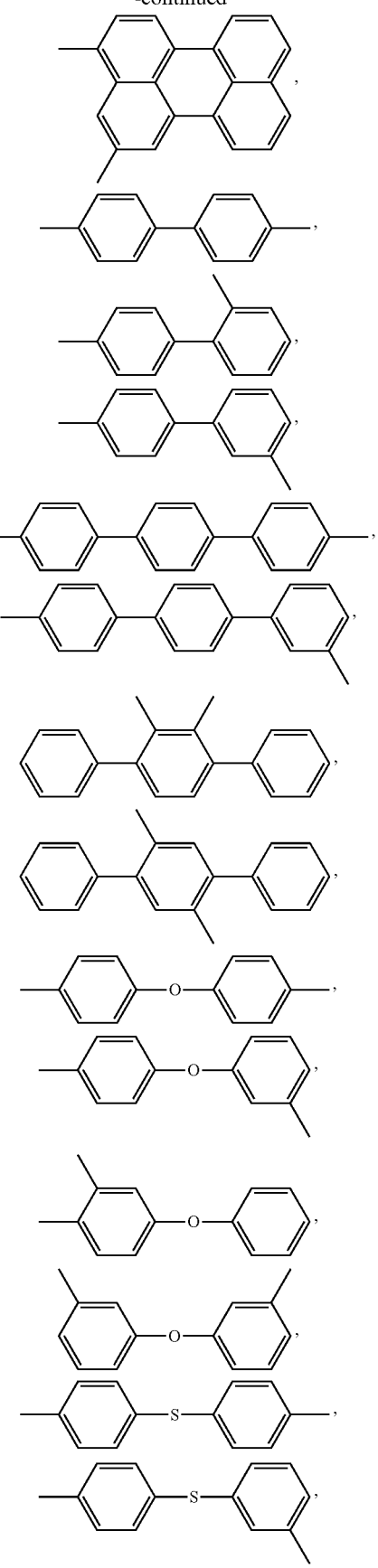

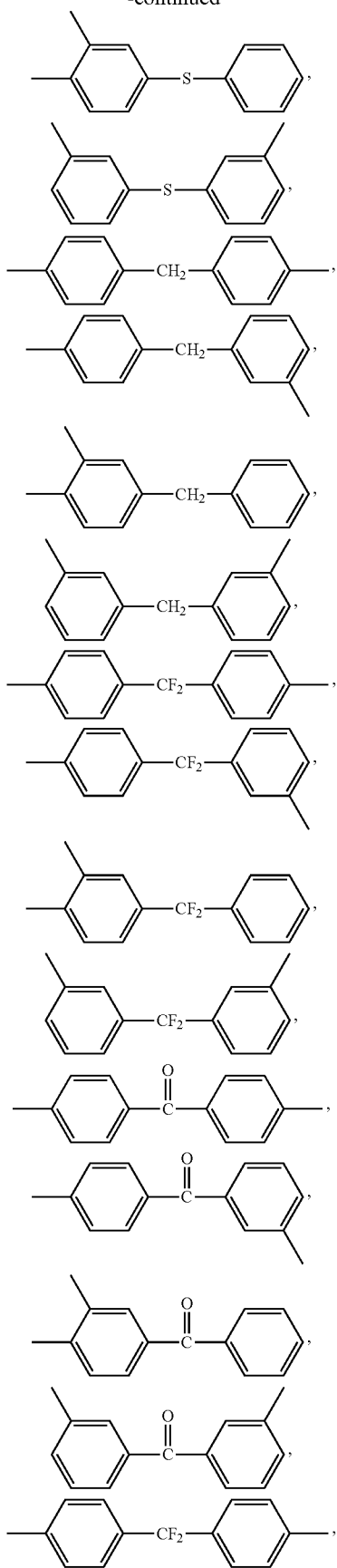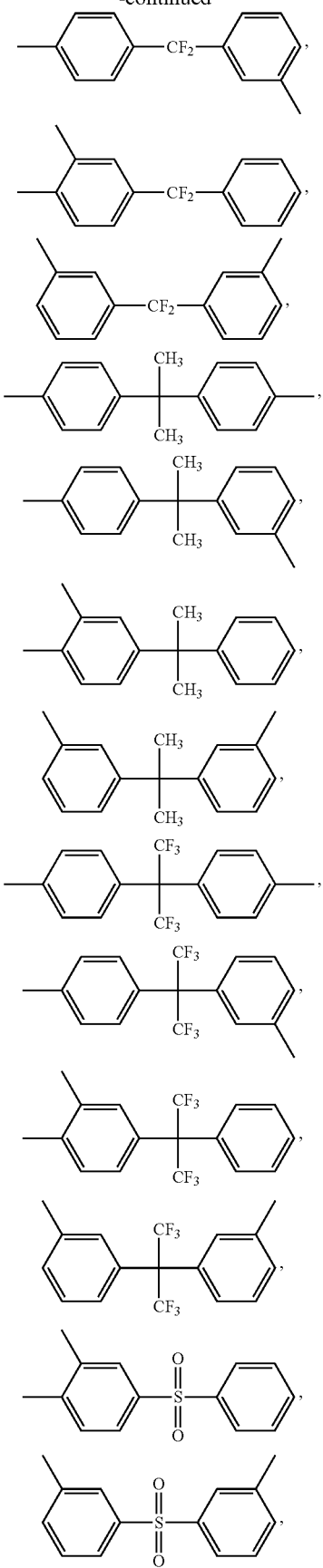

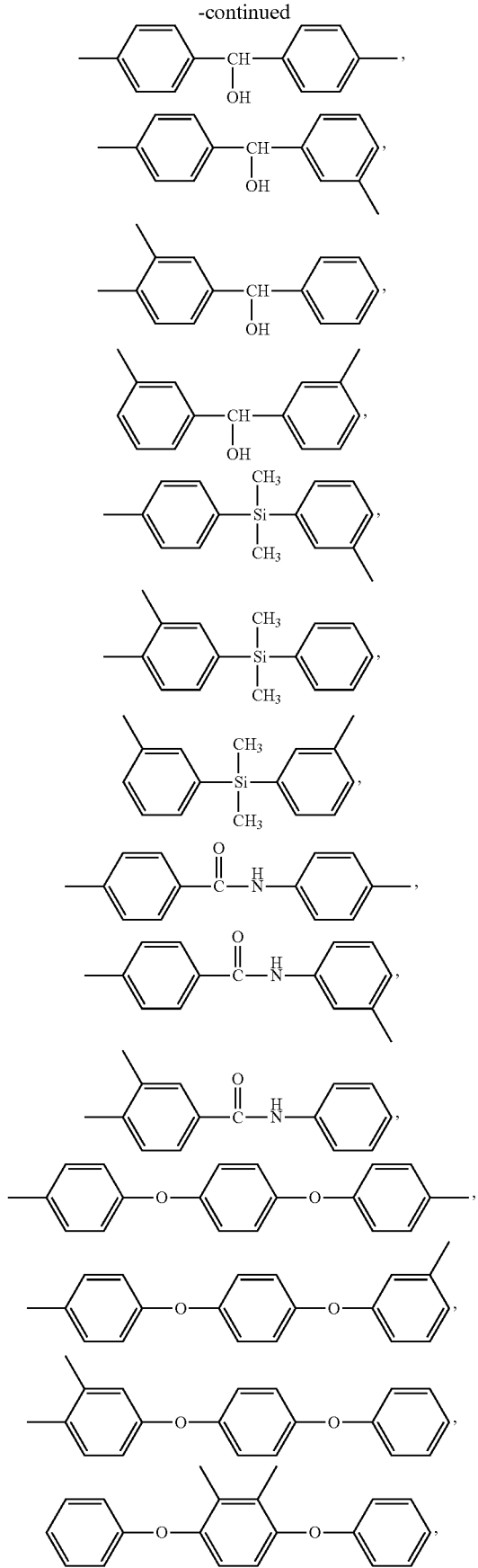
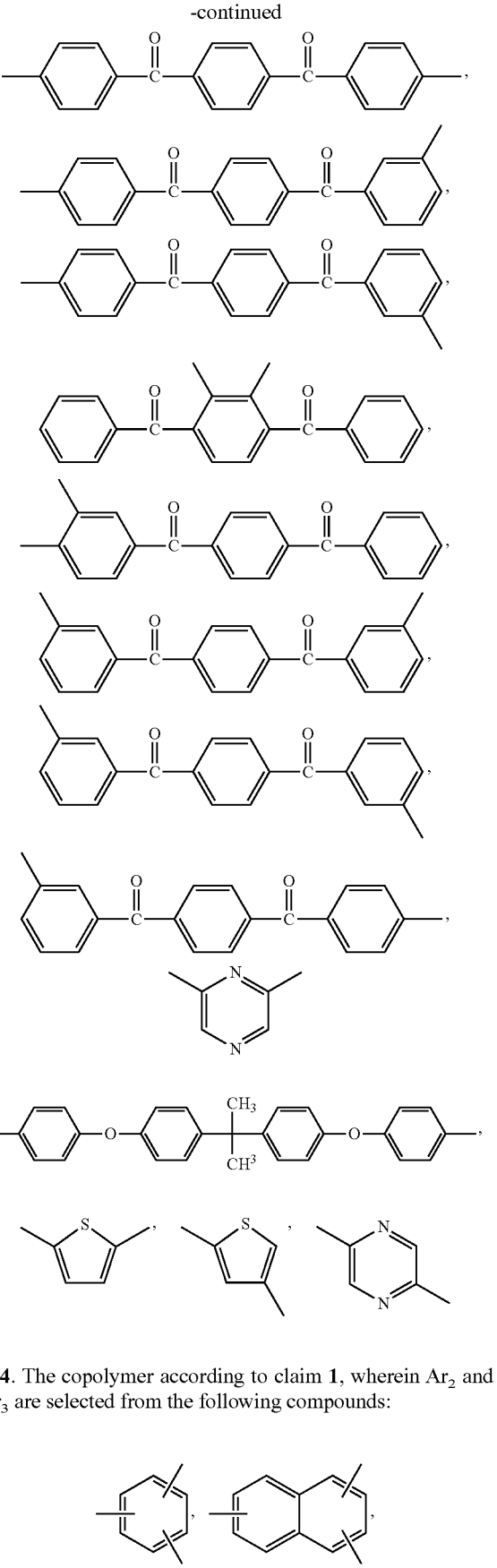
4. The copolymer according to claim 1, wherein $Ar_2$ and $Ar_3$ are selected from the following compounds:
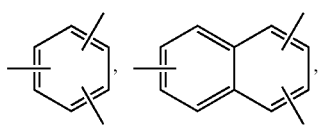

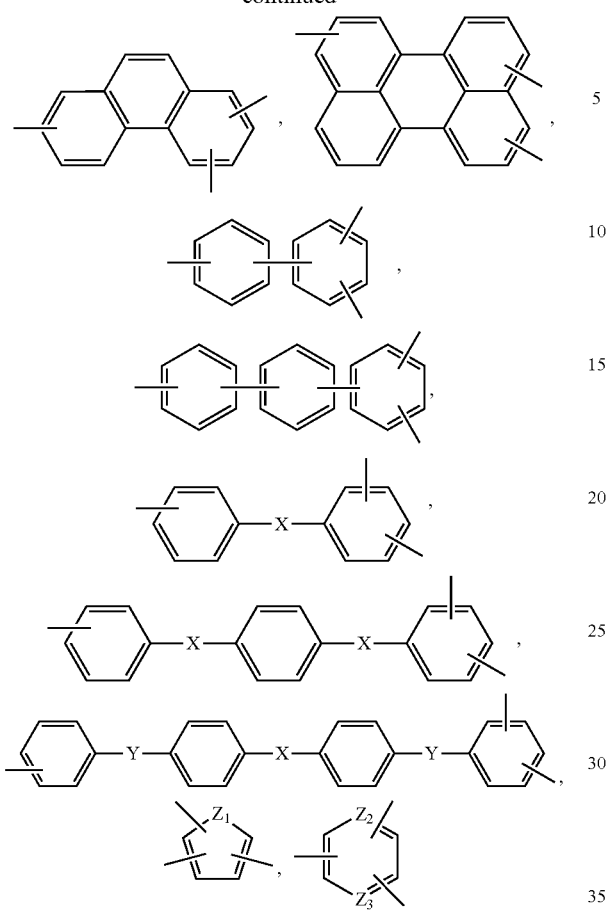
wherein X is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, or C(=O)NH; Y is O, S or C(=O); and Z$_1$, Z$_2$ and Z$_3$ are identical or different and are O, N or S.
5. The copolymer according to claim 1, wherein Ar$_2$ and Ar$_3$ are selected from the following compounds:
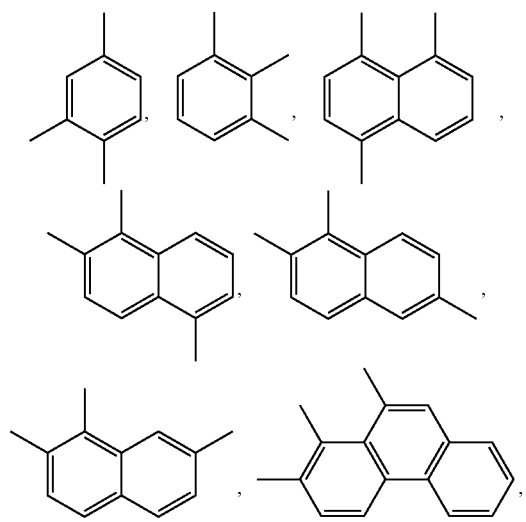
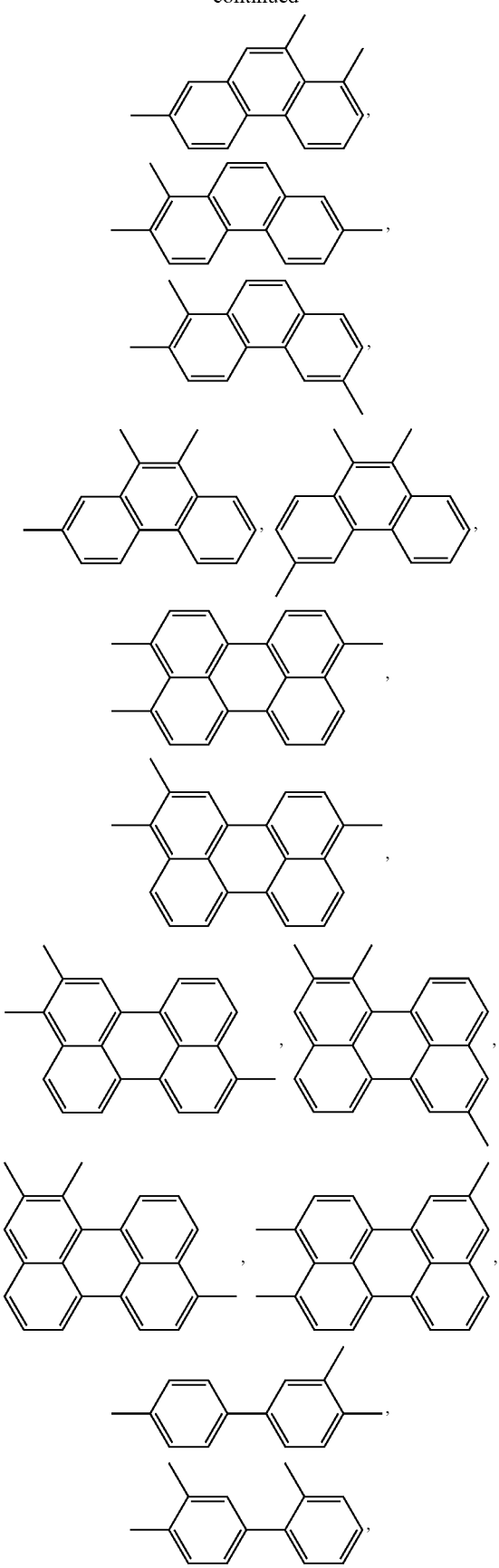

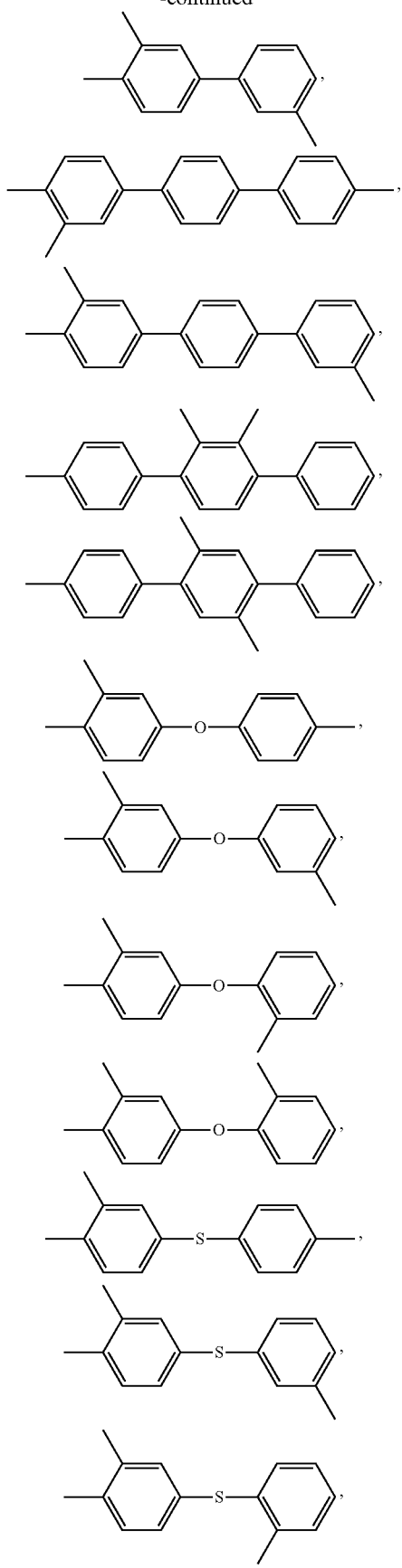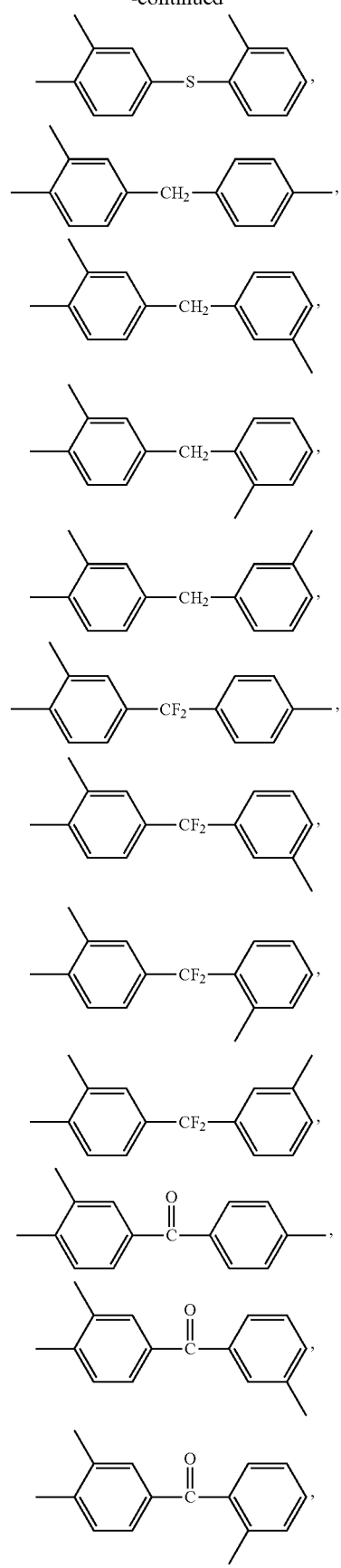

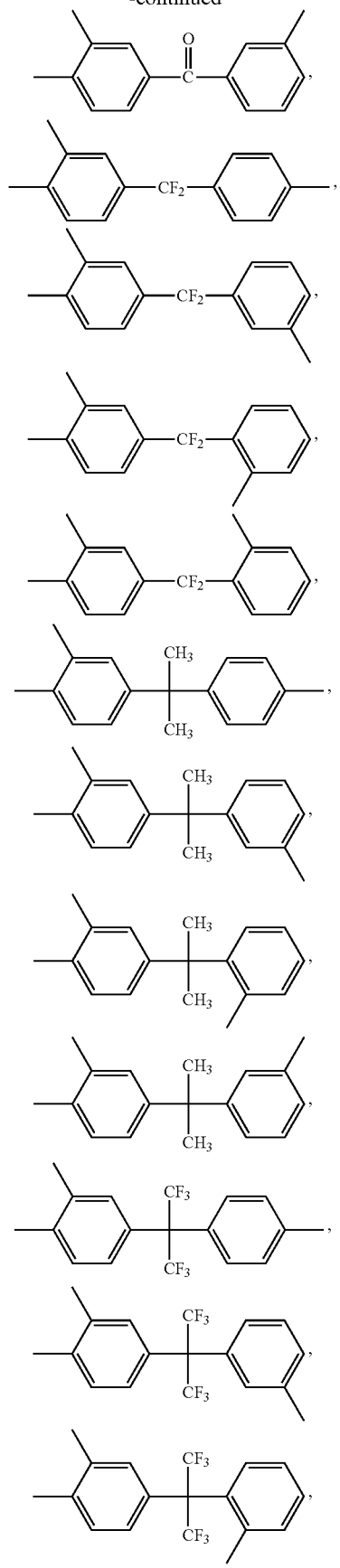
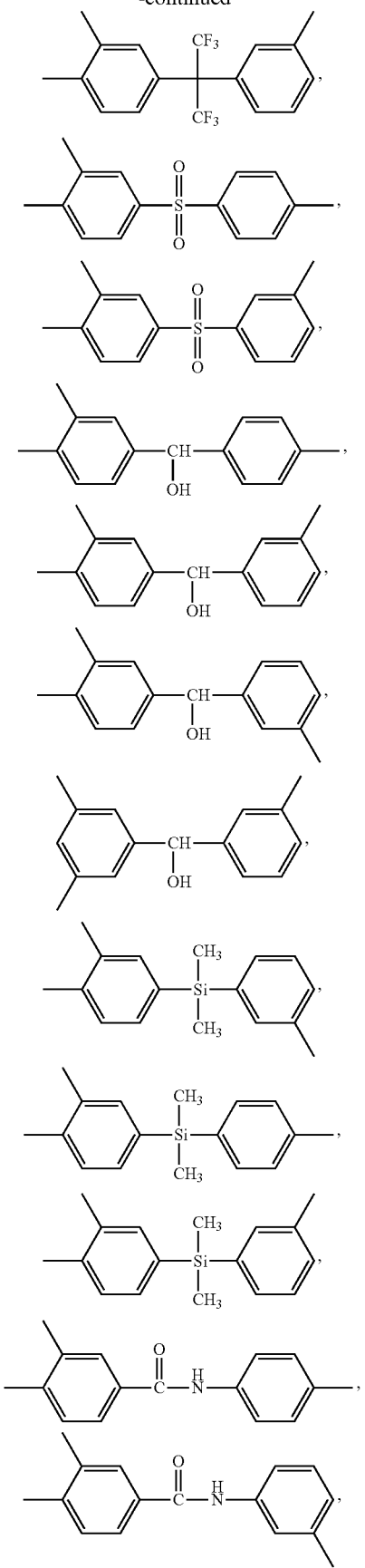

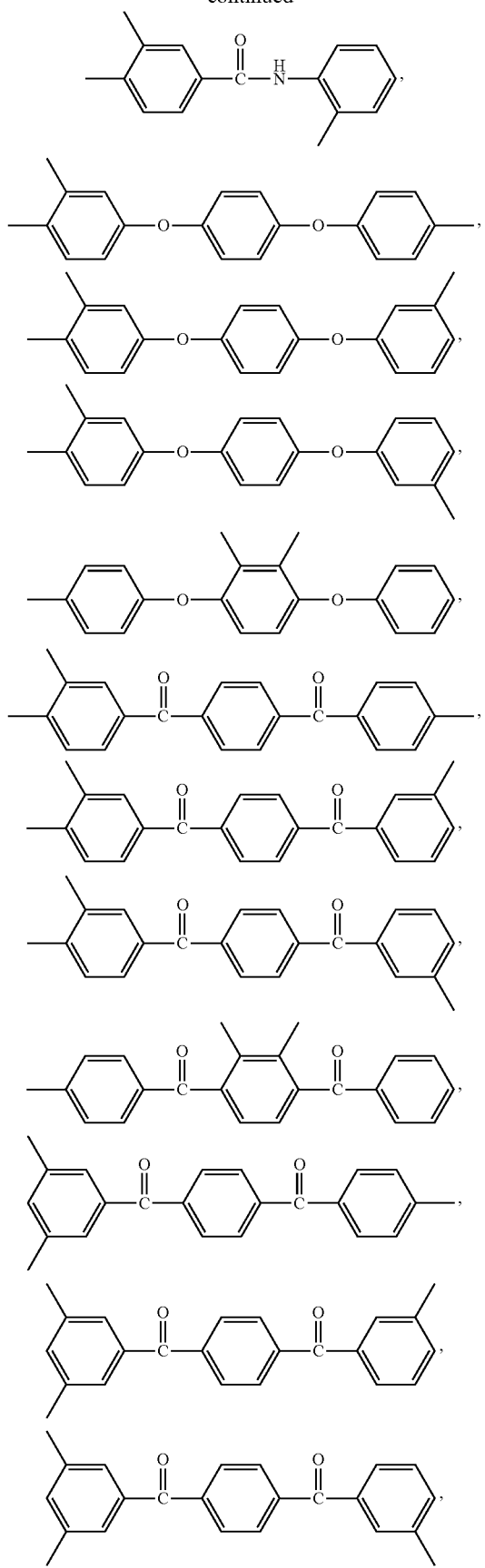

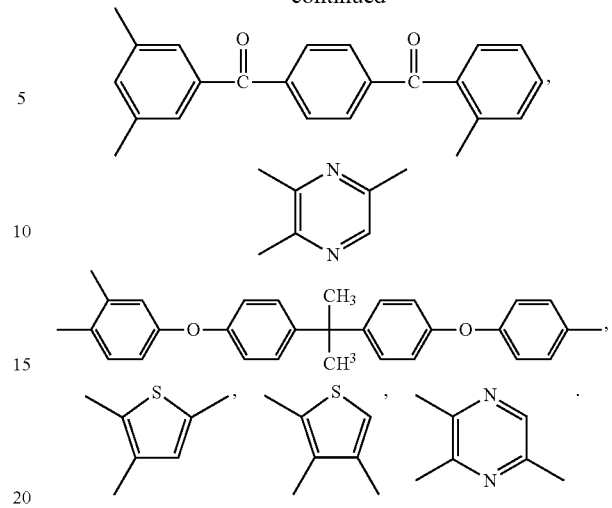

6. The copolymer according to claim 1, wherein Q is selected from the group consisting of $C(CH_3)_2$, $C(CF_3)_2$, $C(=O)NH$, $C(CH_3)(CF_3)$,

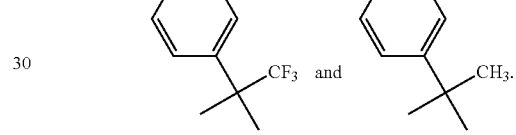

7. The copolymer according to claim 1, wherein $Ar_1$ is

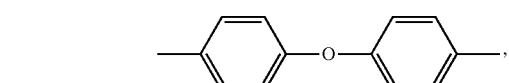

$Ar_2'$ and $Ar_3'$ are

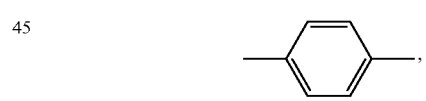

$Ar_2$ and $Ar_3$ are

and Q is $C(CF_3)_2$.

8. The copolymer according to claim 1, wherein the copolymer has a copolymerization ratio of PBO:PI (n:m) of 1:9 to 9:1.

9. The copolymer according to claim 1, wherein the copolymer has a copolymerization ratio of PBO:PI (n:m) of 2:8 to 8:2.

10. The copolymer according to claim 1, wherein the copolymer has a copolymerization ratio of PBO:PI (n:m) of 3:7 to 7:3.

11. The copolymer according to claim 1, wherein the copolymer has a density 1.10 to 1.37 g/cm$^3$.

12. The copolymer according to claim 1, wherein the copolymer has a fractional free volume (FFV) of 0.10 to 0.30.

13. The copolymer according to claim 1, wherein the copolymer has a d-spacing of 0.55 to 0.70 nm.

14. The copolymer according to claim 1, wherein the copolymer has a weight average molecular weight of 10,000 to 50,000 Da.

15. A method for preparing the polyimide-polybenzoxazole copolymer of Formula 1 of claim 1, comprising thermally treating a polyimide-poly(hydroxyimide) copolymer of Formula 2, as depicted in Reaction Scheme 1 below:

16. The method according to claim 15, wherein the thermal treatment is carried out at 150 to 500° C. for 5 minutes to 12 hours under an inert atmosphere.

17. The method according to claim 15, wherein the thermal treatment is carried out at 350 to 450° C. for 10 minutes to 2 hours under an inert atmosphere.

18. The method according to claim 15, wherein the polyimide-poly(hydroxyimide) copolymer of Formula 2 is prepared by reacting the compounds of Formulae 3, 4 and 5 as monomers with one another to prepare polyimide of Formula 6 and poly(hydroxyimide) of Formula 7, and copolymerizing the polyimide of Formula 6 with the poly(hydroxyimide) of Formula 7, as depicted in Reaction Scheme 2 below:

Reaction Scheme 1

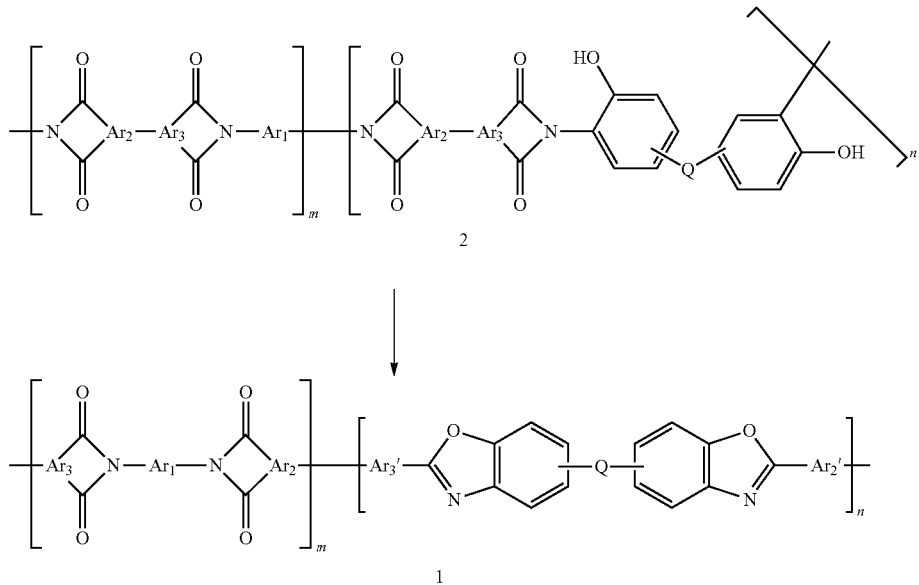

wherein Ar$_1$, Ar$_2$, Ar$_2$', Ar$_3$, Ar$_3$', Q, m and n are defined as above.

Reaction Scheme 2

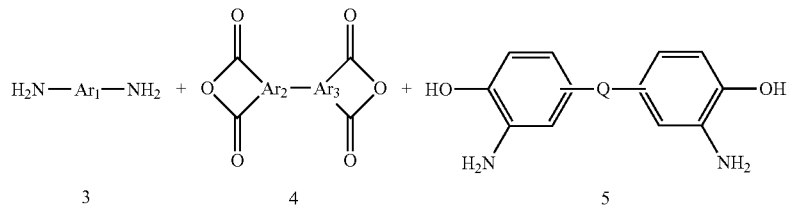

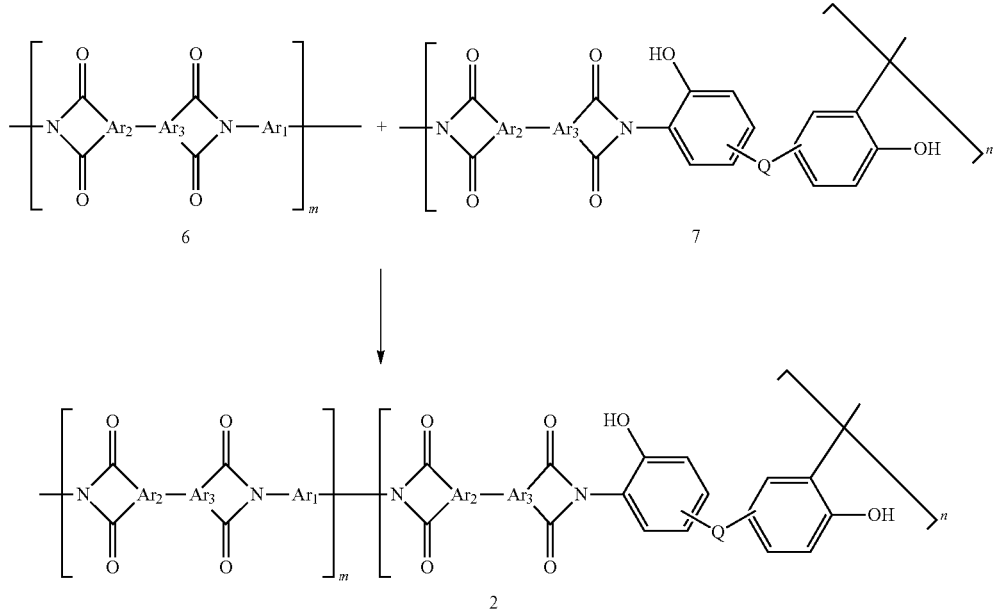

wherein $Ar_1$, $Ar_2$, $Ar_3$, Q, m and n are defined as above.

19. A gas separation membrane comprising the polyimide-polybenzoxazole copolymer of Formula 1 below:

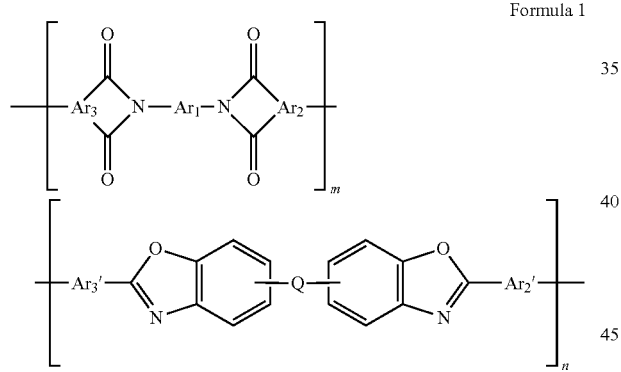

Formula 1 wherein $Ar_1$, $Ar_2'$ and $Ar_3'$ are identical or different, are each independently a bivalent $C_5$-$C_{24}$ arylene group or a bivalent $C_5$-$C_{24}$ heterocyclic ring which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring, or covalently bonded to each other via a functional group selected from the group consisting of O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$ and C(=O)NH;

$Ar_2$ and $Ar_3$ are identical or different, are each independently a trivalent $C_5$-$C_{24}$ arylene group or a trivalent $C_5$-$C_{24}$ heterocyclic ring which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring, or covalently bonded to each other via a functional group selected from the group consisting of O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$ and C(=O)NH;

Q is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, C(=O)NH, C(CH$_3$)(CF$_3$), $C_1$-$C_6$ alkyl-substituted phenyl or $C_1$-$C_6$ haloalkyl-substituted phenyl in which Q is linked to opposite both phenyl rings in the position of m-m, m-p, p-m or p-p;

m is an integer of 10 to 400; and n is an integer of 10 to 400.

20. The gas separation membrane according to claim 19, wherein $Ar_1$, $Ar_2'$ and $Ar_3'$ are selected from the following compounds:

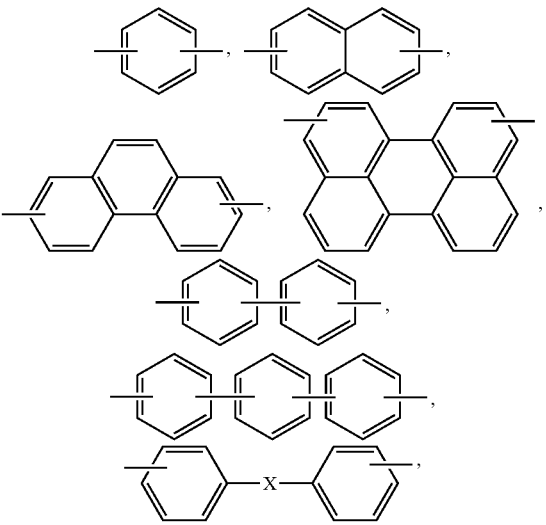

-continued
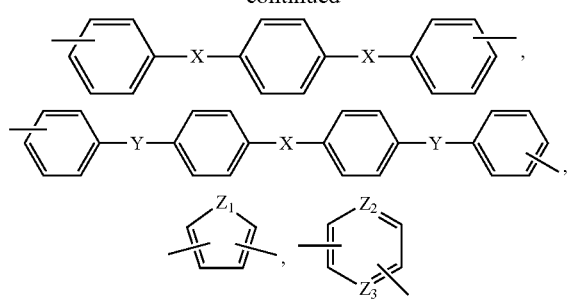
wherein X is O, S, C(=O), CH(OH), S(=O)$_2$, Si(CH$_3$)$_2$, (CH$_2$)$_p$ (in which 1≤p≤10), (CF$_2$)$_q$, (in which 1≤q≤10), C(CH$_3$)$_2$, C(CF$_3$)$_2$, or C(=O)NH; Y is O, S or C(=O); and Z$_1$, Z$_2$ and Z$_3$ are identical or different and are O, N or S.
21. The gas separation membrane according to claim 19, wherein Ar$_1$, Ar$_2$' and Ar$_3$' are selected from the following compounds:
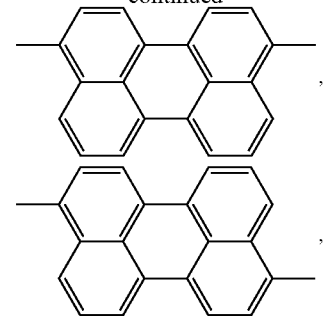
-continued
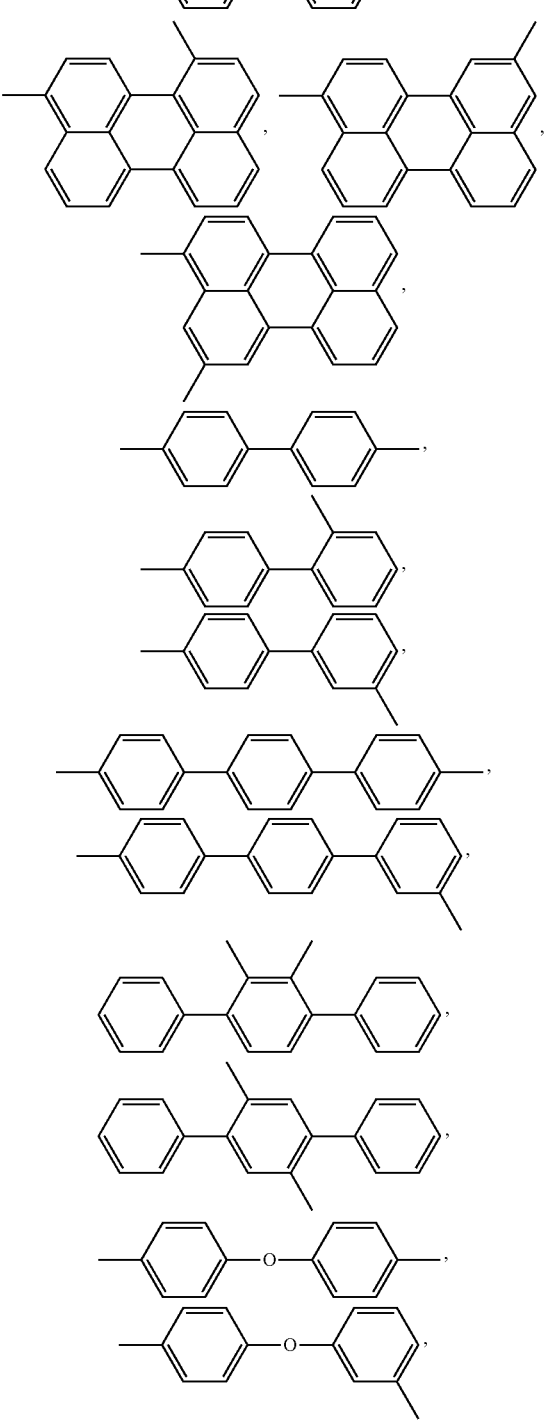

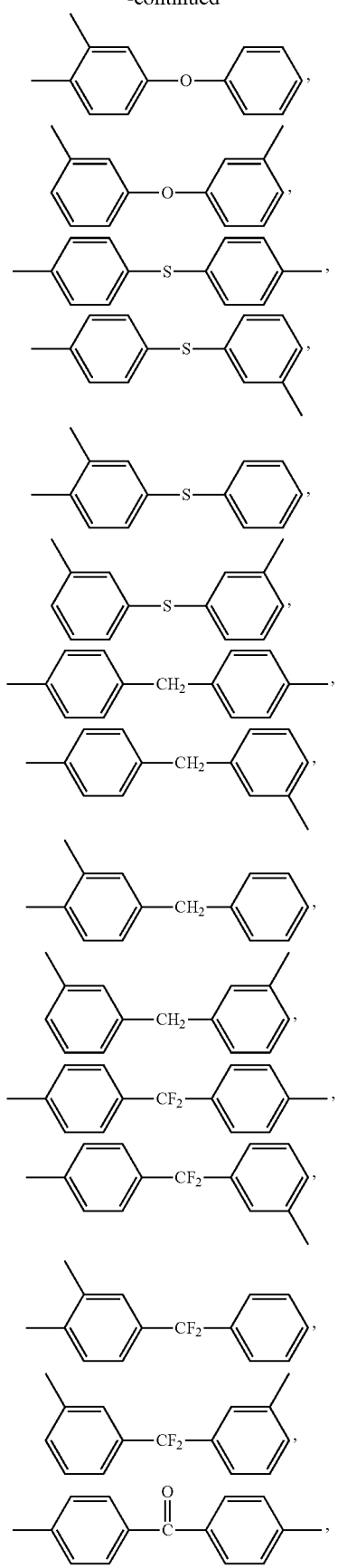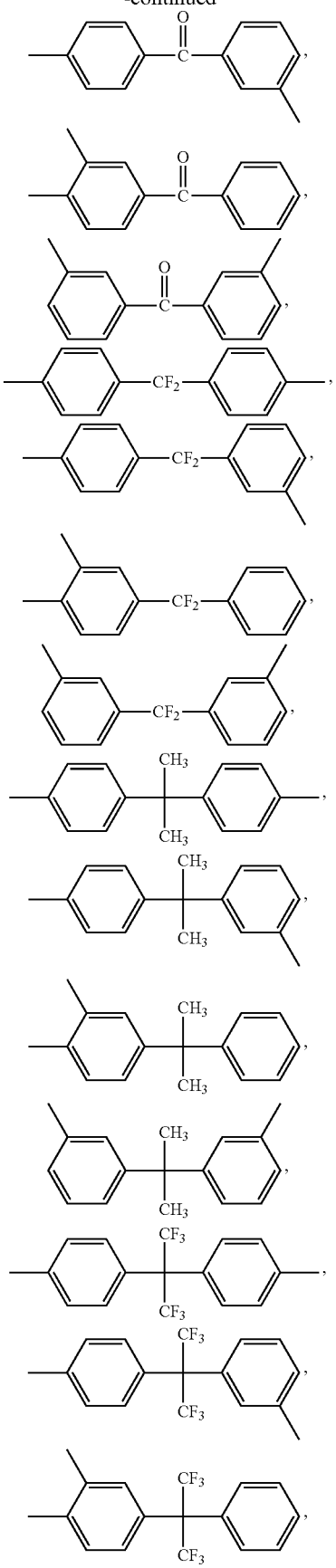

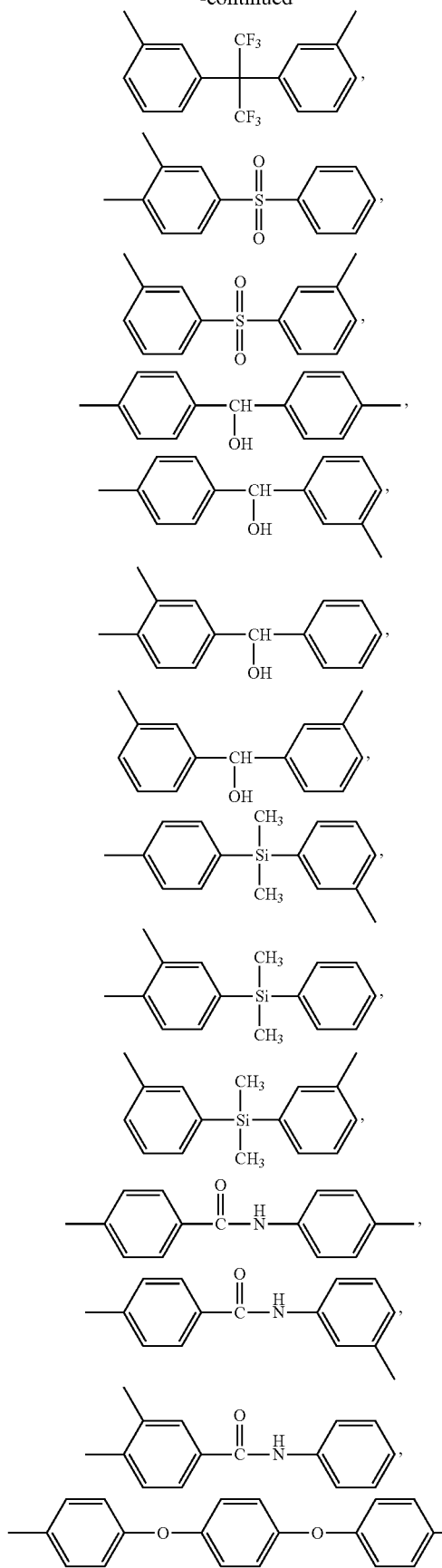
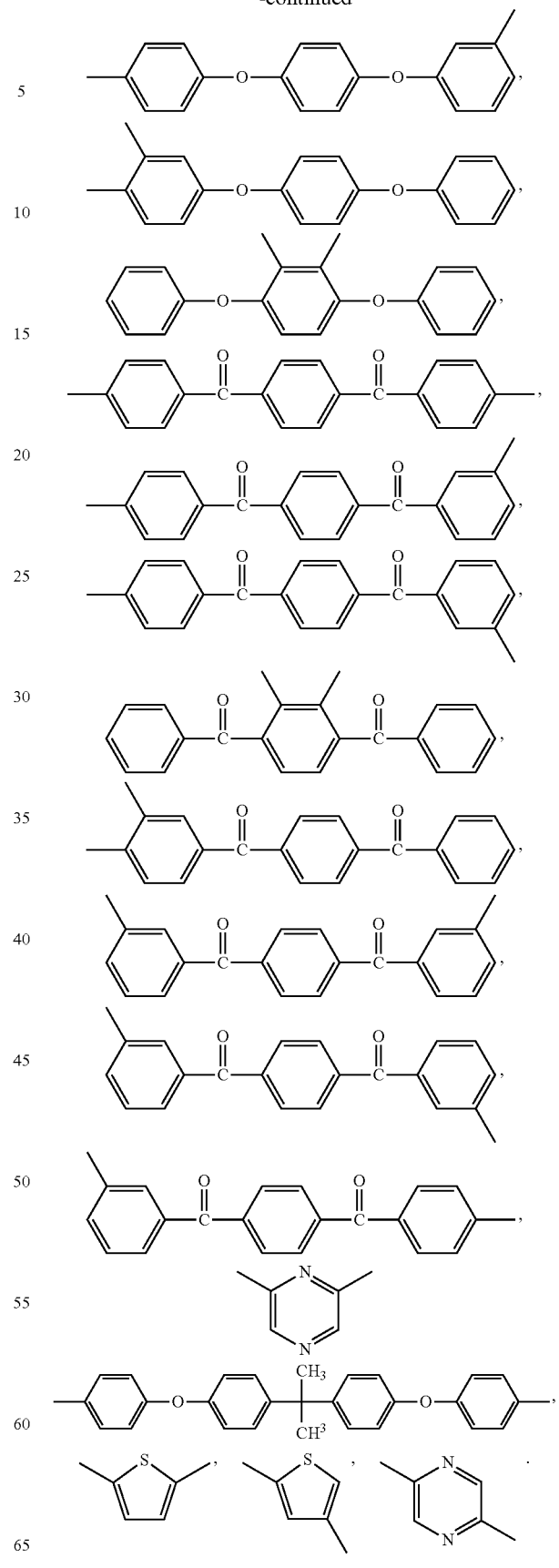

22. The gas separation membrane according to claim 19, wherein $Ar_2$ and $Ar_3$ are selected from the following compounds:

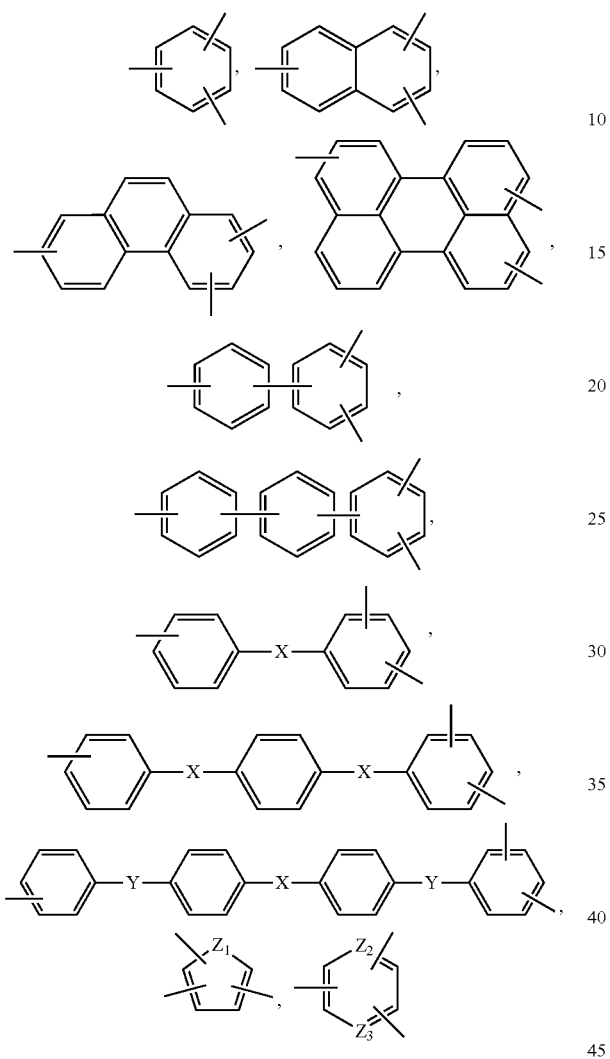

wherein X is O, S, C(═O), CH(OH), S(═O)$_2$, Si(CH$_3$)$_2$, (CH$_2$)$_p$ (in which 1≤p≤10), (CF$_2$)$_q$, (in which 1≤q≤10), C(CH$_3$)$_2$, C(CF$_3$)$_2$, or C(═O)NH; Y is O, S or C(═O); and $Z_1$, $Z_2$ and $Z_3$ are identical or different and are O, N or S.

23. The gas separation membrane according to claim 19, wherein $Ar_2$ and $Ar_3$ are selected from the following compounds:

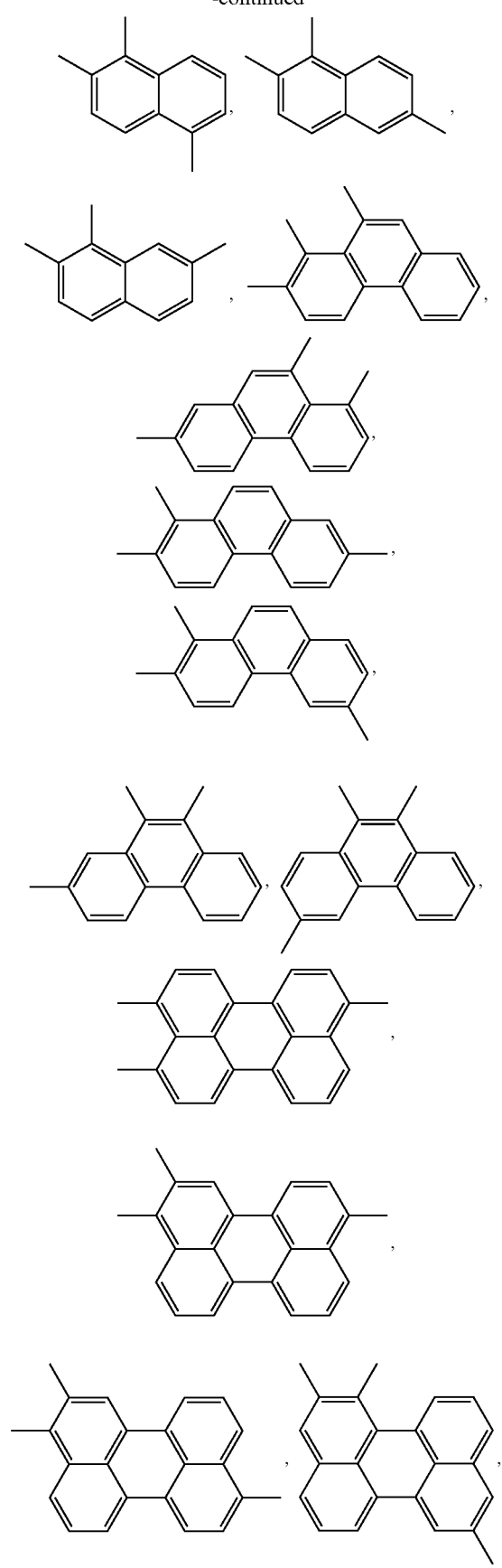

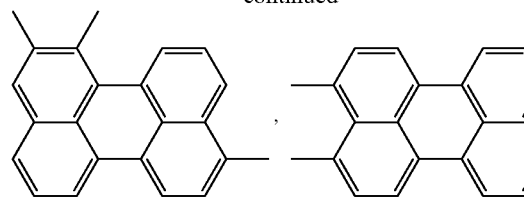,
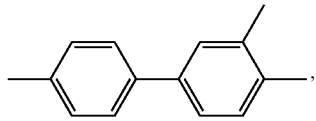,
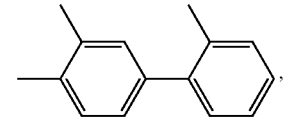,
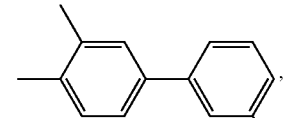,
,
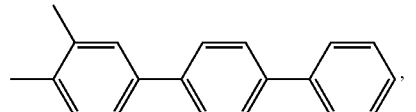,
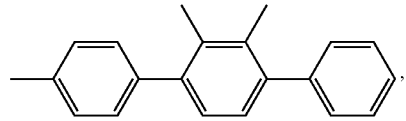,
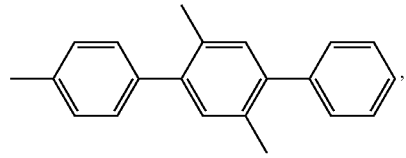,
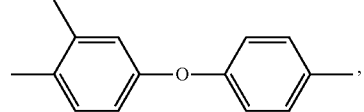,
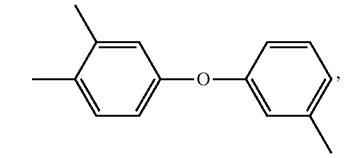,
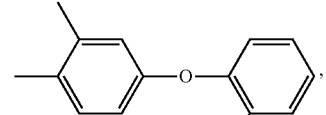,
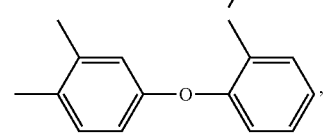,
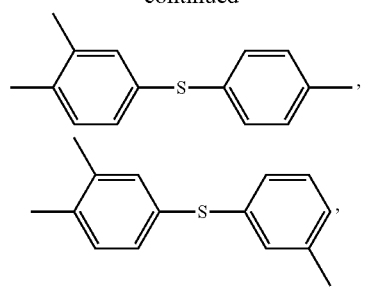,
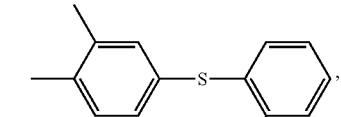,
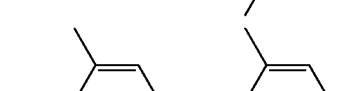,
,
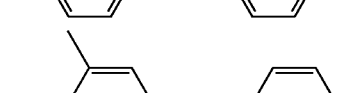,
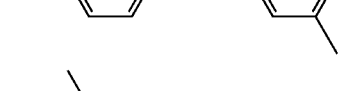,
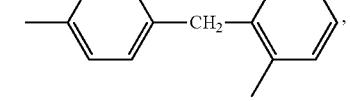,
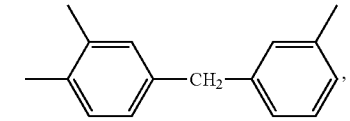,
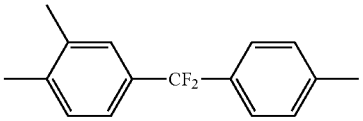,
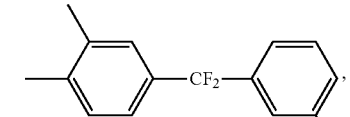,
,
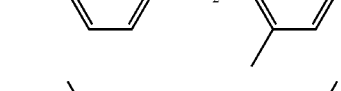,
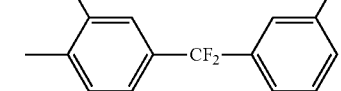, -continued
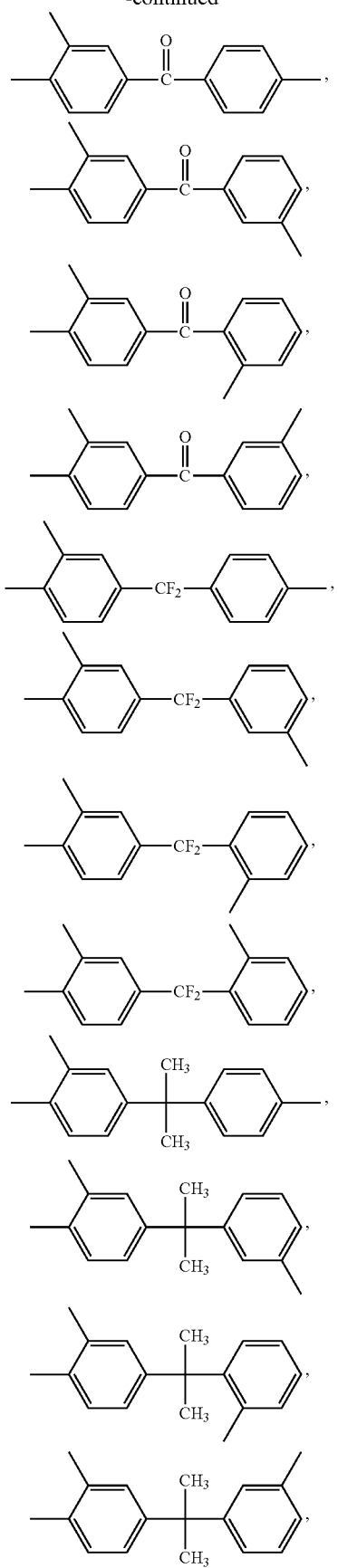
-continued
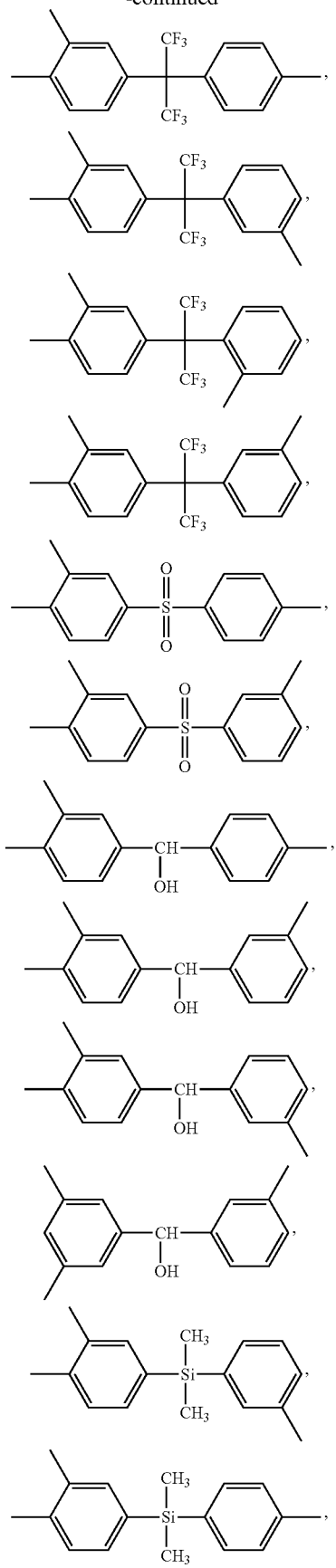

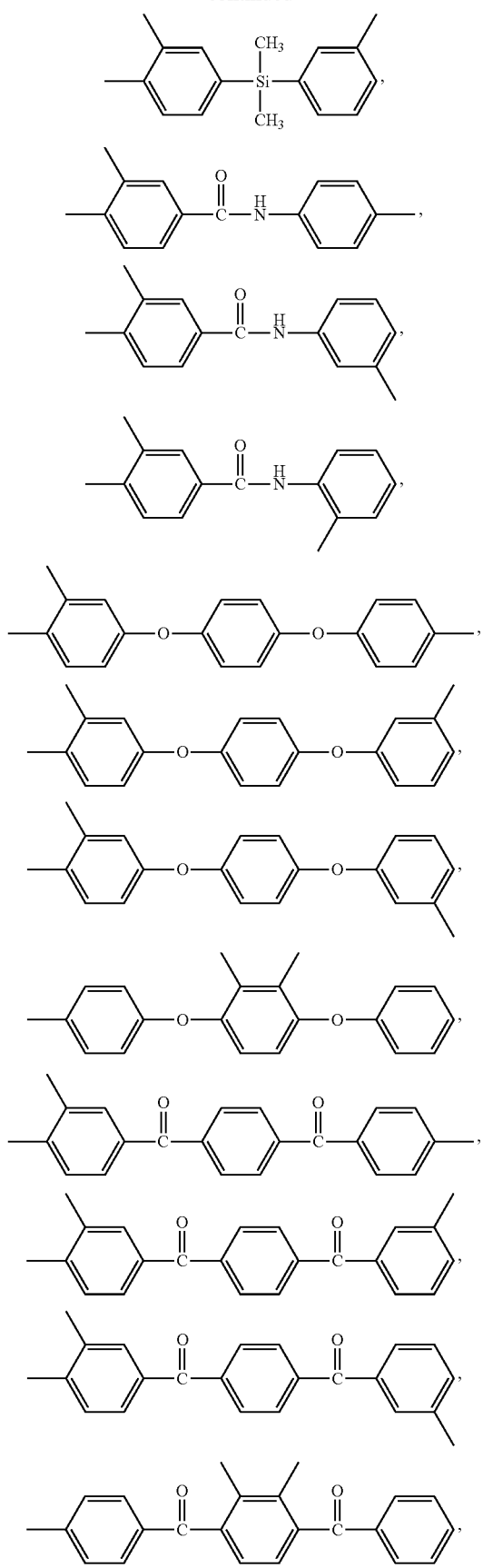
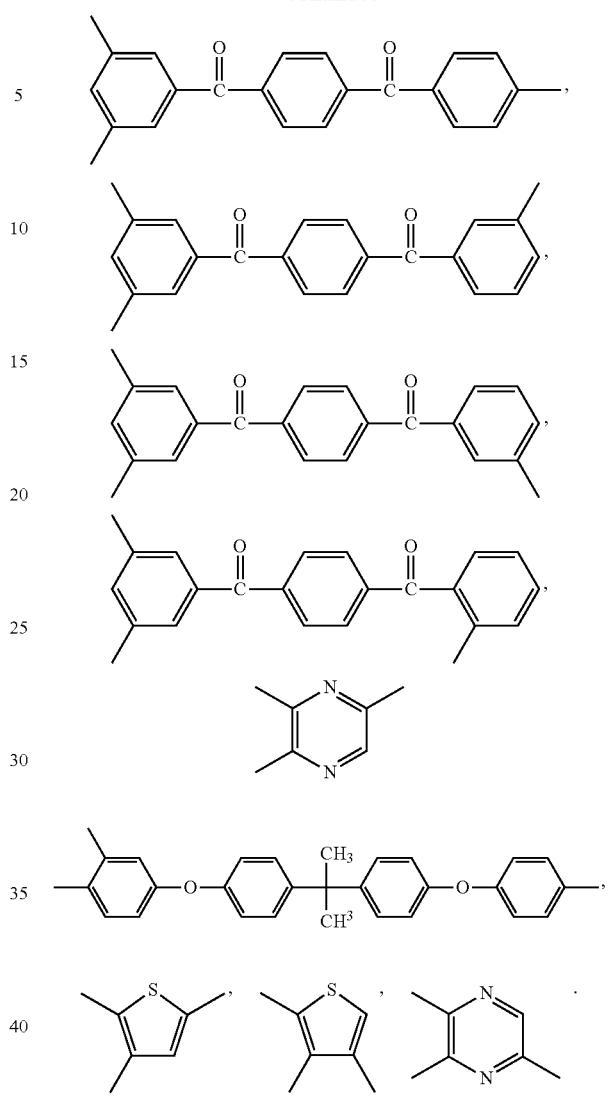
24. The gas separation membrane according to claim 19, wherein Q is selected from the group consisting of $C(CH_3)_2$, $C(CF_3)_2$, $C(=O)NH$, $C(CH_3)(CF_3)$,
25. The gas separation membrane according to claim 19, wherein $Ar_1$ is Ar$_2$' and Ar$_3$' are

Ar$_2$ and Ar$_3$ are

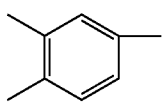

and Q is C(CF$_3$)$_2$.

26. The gas separation membrane according to claim 19, wherein the copolymer has a copolymerization ratio of PBO:PI (n:m) of 1:9 to 9:1.

27. The gas separation membrane according to claim 19, wherein the copolymer has a copolymerization ratio of PBO:PI (n:m) of 2:8 to 8:2.

28. The gas separation membrane according to claim 19, wherein the copolymer has a copolymerization ratio of PBO:PI (n:m) of 3:7 to 7:3.

29. The gas separation membrane according to claim 19, wherein the copolymer has a density 1.10 to 1.37 g/cm$^3$.

30. The gas separation membrane according to claim 19, wherein the copolymer has a fractional free volume (FFV) of 0.10 to 0.30.

31. The gas separation membrane according to claim 19, wherein the copolymer has a d-spacing of 0.55 to 0.70 nm.

32. The gas separation membrane according to claim 19, wherein the copolymer has a weight average molecular weight of 10,000 to 50,000 Da.

33. The gas separation membrane according to claim 19, wherein the copolymer has a specific surface area of 0.1 to 480 m$^2$/g.

34. The gas separation membrane according to claim 19, wherein the copolymer has a total pore volume of 0.0004 to 0.25 m$^3$.

35. The gas separation membrane according to claim 19, wherein the copolymer has a pore size of 21 to 40 Å.

36. The gas separation membrane according to claim 19, wherein the gas separation membrane is used to separate gas pair of O$_2$/N$_2$, CO$_2$/CH$_4$, CO$_2$/N$_2$ or N$_2$/CH$_4$.

37. The gas separation membrane according to claim 19, wherein the gas separation membrane is in the form of a film, a fiber or a hollow fiber.

38. A method for preparing the gas separation membrane of claim 19 comprising the PBO-PI copolymer of Formula 1, comprising casting a HPI-PI copolymer of Formula 2, followed by thermal treatment.

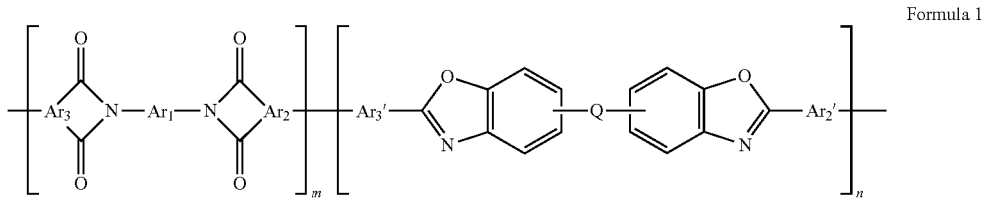

Formula 1 wherein Ar$_1$, Ar$_2$, Ar$_2$', Ar$_3$, Ar$_3$', Q, m and n are defined as above.

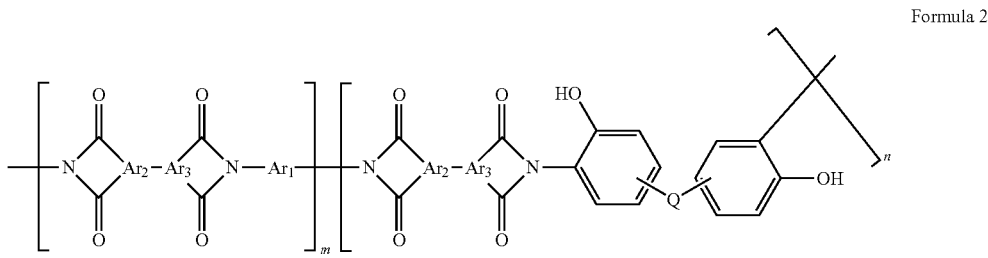

Formula 2 wherein Ar$_1$, Ar$_2$, Ar$_3$, Q, m and n are defined as above.

* * * * *